(12) United States Patent
Hamada et al.

(10) Patent No.: US 8,531,627 B2
(45) Date of Patent: Sep. 10, 2013

(54) OPTICAL ROTATION PLATE AND LIQUID CRYSTAL DISPLAY DEVICE USING THE SAME

(75) Inventors: Satoru Hamada, Tokyo-to (JP); Keiji Kashima, Tokyo-to (JP); Takashi Kuroda, Tokyo-to (JP); Hirofumi Yumoto, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 787 days.

(21) Appl. No.: 12/645,894

(22) Filed: Dec. 23, 2009

(65) Prior Publication Data
US 2010/0165258 A1    Jul. 1, 2010

(30) Foreign Application Priority Data

Dec. 25, 2008  (JP) .................. 2008-331067
Mar. 11, 2009  (JP) .................. 2009-057757

(51) Int. Cl.
*G02F 1/1347*    (2006.01)

(52) U.S. Cl.
USPC ............. 349/76; 349/98; 349/175; 349/96; 349/117; 349/115

(58) Field of Classification Search
USPC ............. 349/76, 194, 115, 98, 117
See application file for complete search history.

(56) References Cited

U.S. PATENT DOCUMENTS

| | | | | |
|---|---|---|---|---|
| 6,072,566 A | | 6/2000 | Fujii et al. | |
| 6,297,864 B1 * | | 10/2001 | Kaneko et al. | 349/117 |
| 6,717,644 B2 * | | 4/2004 | Schadt et al. | 349/124 |
| 6,727,967 B2 * | | 4/2004 | Nakamura et al. | 349/114 |
| 7,719,643 B2 * | | 5/2010 | Kashima et al. | 349/117 |
| 7,841,730 B2 * | | 11/2010 | Hara et al. | 362/19 |
| 2002/0176167 A1 | | 11/2002 | Kashima | |
| 2005/0088740 A1 * | | 4/2005 | Takeda et al. | 359/489 |
| 2005/0134774 A1 * | | 6/2005 | Coates et al. | 349/117 |
| 2009/0279023 A1 * | | 11/2009 | Smith et al. | 349/98 |
| 2010/0134724 A1 * | | 6/2010 | Arakawa et al. | 349/96 |

FOREIGN PATENT DOCUMENTS

| | | |
|---|---|---|
| JP | 06-003525 A | 1/1994 |
| JP | 06-258634 A | 9/1994 |
| JP | 10-010522 A | 1/1998 |
| JP | 10-010523 A | 1/1998 |
| JP | 10-090675 A | 4/1998 |
| JP | 2003-021720 A | 1/2003 |
| WO | 2004-039772 A | 11/2004 |
| WO | 2007-322498 A | 12/2007 |

* cited by examiner

*Primary Examiner* — Edward Glick
*Assistant Examiner* — Sang V Nguyen
(74) *Attorney, Agent, or Firm* — Ladas & Parry LLP

(57) ABSTRACT

A main object of the present invention is to provide a rotating plate hardly generating variation in the rotation angle of the liner polarization so as to easily realize a desired rotation angle, and a liquid crystal display device enabling observation of a bright image by use thereof even in a state with a polarizing glasses put on. To attain the object, the present invention provides an optical rotation plate comprising a transparent substrate, and an optical rotation layer formed on the transparent substrate and containing a rod-shaped compound for forming a cholesteric structure and having a function of rotating transmitted liner polarization, wherein the cholesteric structure has a 90 degrees or larger twist angle and a pitch in a range of 450 nm to 4,000 nm.

10 Claims, 16 Drawing Sheets

FIG. 10

| LC1057 | : | LC756 | Film Thickness (μm) | Selective Reflection Center Wavelength (nm) | Pitch (nm) | Twist Angle (°) |
|---|---|---|---|---|---|---|
| 97.9 | : | 2.1 | 1.5 | 780 | 491 | 1100 |
|  |  |  | 3.0 |  |  | 2200 |
|  |  |  | 4.5 |  |  | 3300 |
| 97.5 | : | 2.5 | 1.5 | 830 | 523 | 1033 |
|  |  |  | 3.0 |  |  | 2067 |
|  |  |  | 4.5 |  |  | 3100 |
| 97.0 | : | 3.0 | 1.5 | 1050 | 662 | 816 |
|  |  |  | 3.0 |  |  | 1633 |
|  |  |  | 4.5 |  |  | 2449 |
| 96.3 | : | 3.7 | 1.5 | 1280 | 807 | 669 |
|  |  |  | 3.0 |  |  | 1339 |
|  |  |  | 4.5 |  |  | 2008 |
| 96.0 | : | 4.0 | 1.5 | 1520 | 958 | 563 |
|  |  |  | 3.0 |  |  | 1127 |
|  |  |  | 4.5 |  |  | 1690 |

OPTICAL ROTATION PLATE AND LIQUID CRYSTAL DISPLAY DEVICE USING THE SAME

FIELD OF THE INVENTION

The present invention relates to an optical rotation plate having a function of rotating linear polarization, and a liquid crystal display device using the optical polarizing plate enabling observation without darkening the display even in a state of wearing polarizing glasses.

DESCRIPTION OF THE RELATED ART

In a current liquid crystal display device, the polarization state of a display light ejected from a display screen is linear polarization. For example, when the liquid crystal display device is viewed from the front side, in the case of the TN mode, the polarization transmission axis is set so as to be oriented in the oblique direction of the screen in most cases. On the other hand, in the case of the VA mode or the IPS mode, it is oriented in the vertical direction in many cases. However, among those used for the advertisement for the exterior or interior uses, some have only the circuit change so as to be installed longitudinally in the vertical direction with the polarization transmission axis set approximately in the horizontal direction. The reason why the polarization transmission axis of the linear polarization ejected from the liquid crystal display device is oriented in such directions is that a light beam capable of transmitting a polarizing plate disposed on the display side of the liquid crystal display device is a linear polarization coinciding with the orientation of the polarization transmission axis of the polarizing plate. That is, the polarization transmission axis of the polarizing plate disposed on the display side of the liquid crystal display device is set in the oblique direction in the case of the TN mode, and it is set in the horizontal direction in the case of the VA mode and the IPS mode for the advertisement.

On the other hand, in the case of employing the current liquid crystal display devices as mentioned above as a display part used outside or under a strong beam utilizing the TN mode in many cases, such as a display device for an automobile display device, a navigation device, a display device for an airline cockpit, a mobile radio, a mobile phone, a fish finder, a wristwatch, and a display device for exterior or interior use, if one views such a liquid crystal display device through polarizing glasses, which are often used in such an environment, the polarization transmission characteristics of the liquid crystal display device and the polarizing glasses pose adverse influences to each other so as to cause a problem of extremely deteriorating the visual recognition property due to the dark and hardly visible display. The reason is that the polarization transmission axis from the display screen and the polarization transmission axis of the polarizing glasses do not coincide with each other since the polarization transmission axis of the polarizing glasses is set in the vertical direction so as to remarkably lowering the light beam transmittance of the polarizing glasses.

Here, the reason why the polarization transmission axis direction of the polarization lens of the polarizing glasses is oriented substantially in the vertical direction is that since the reflected light from the refractive index interface such as the water surface includes the S polarization more than the P polarization, it is set so as to prevent glaring by reflection at the refractive index interface such as the water surface.

In view of the problems mentioned above, Japanese Patent Application Laid-Open (JP-A) No. 10-10523 discloses a technique of having linear polarization processed into circular polarization by disposing a λ/4 retardation plate on the display side of the liquid crystal display device. According to the method, since the linear polarization directed to the display side is removed, even in a state with the polarizing glasses put on, the image can be observed. However, on the other hand, since the linear polarization is converted into the circular polarization so that the light supplied to the display is dispersed in the all directions, a problem is involved in that the image observed in a state with the polarizing glasses put on is darkened.

Moreover, JP-A No. 10-10522 discloses a liquid crystal display device enabling visual recognition even in a state with polarizing glasses put on by removing the linear polarization using a depolarization plate. However, since the depolarization plate is extremely expensive so that it is not suitable for the liquid crystal display device to which cost reduction is required due to drastic market expansion, and furthermore, since the light supplied to the display is dispersed in the all directions, a problem is involved in that the image observed in a state with the polarizing glasses put on is darkened.

Furthermore, JP-A No. 6-3525 discloses a rotating plate capable of rotating linear polarization along the twist angle of the liquid crystal material. According to the rotating plate, since the polarization axis orientation of the linear polarization is rotated, by use thereof to the liquid crystal display device, the image can be observed even in a state with the polarizing glasses put on. Moreover, in the case of the rotating plate, since the light is simply rotated, a liquid crystal display device capable of providing a brighter display can be obtained without decline of the total light amount.

However, since such a rotating plate is for rotating the polarization axis along the twist angle of the liquid crystal material, the rotation angle of the polarization axis of the light coincides with the twist angle of the liquid crystal material. Furthermore, in general, it is difficult to control the twist angle of the liquid crystal material without variation so that in the case of forming such a rotating plate in a large area, variation is generated in the rotation angle according to the variation of the twist angle so that a problem arises in that a homogeneous image can hardly be observed in a state with the polarizing glasses put on.

SUMMARY OF THE INVENTION

Problem to be Solved by the Invention

In view of the problems, the present invention has been achieved, and a main object thereof is to provide a rotating plate hardly generating variation in the rotation angle of the polarization axis so as to easily realize a desired rotation angle, and a liquid crystal display device enabling observation of a bright image by use thereof even in a state with a polarizing glasses put on.

Means for Solving the Problem

In order to achieve the object mentioned above, the present invention provides an optical rotation plate comprising a transparent substrate, and an optical rotation layer formed on the transparent substrate and containing a rod-shaped compound for forming a cholesteric structure and having a function of rotating a polarization axis of transmitted liner polarization, wherein the cholesteric structure has 90 degrees or larger twist angle and a pitch in a range of 450 nm to 4,000 nm.

According to the present invention, since the above-mentioned optical rotation layer contains a rod-shaped compound for forming the cholesteric structure, the polarization axis of the linear polarization transmitting the optical rotating plate of the present invention can be rotated. Since the twist angle of the cholesteric structure is larger than 90 degrees and the pitch is in a range of 450 nm to 4,000 nm, the polarization axis of the linear polarization transmitting the rotating plate of the present invention can be rotated independently of the twist angle of the above-mentioned cholesteric structure. Therefore, since the polarization axis is not rotated along the twist angle of the cholesteric structure in the present invention, even in the case variation is generated in the twist angle of the above-mentioned cholesteric structure, the risk of generating the variation in the rotation angle of the linear polarization can be remarkably reduced. Moreover, according to the invention, since the twist angle and the pitch of the above-mentioned cholesteric structure are in the above-mentioned range, a desired rotation angle can be realized by adjusting the thickness of the rotating layer.

From these aspects, according to the present invention, a rotating plate capable of easily realizing a desired rotation angle, hardly generating variation in the rotation angle of the polarization axis of the linear polarization can be obtained.

In the present invention, it is preferable that the pitch of the above-mentioned cholesteric structure is in a range of 450 nm to 1,350 nm. The cholesteric structure has selective reflection properties of selectively reflecting a light of a wavelength corresponding to its pitch. Since the pitch of the cholesteric structure in the present invention is in the above-mentioned range, the rotating plate of the present invention can be provided with a function of reflecting a heat ray in addition to the rotary polarization of rotating the polarization axis of the linear polarization. The rotating plate of the present invention with the cholesteric structure formed with such a pitch is advantageous in that the durability of the panel can be improved by reflecting the heat ray in addition to that observation is enabled in a state with the polarizing glasses put on in the case of use in the liquid crystal display device.

Here, the pitch of the cholesteric structure and the selective reflection wavelength has the following relationship. The average refractive index in 800 nm to 2,000 nm wavelength of the liquid crystal material, which differs depending on the kind of the liquid crystal and the temperature, is in general, 1.7 to 1.5. In the above-mentioned pitch range, an infrared region (wavelength 800 nm to wavelength 2,000 nm) can be reflected.

$$\lambda = N \times P \quad \text{formula (1)}$$

($\lambda$=selective reflection wavelength, N=average refractive index, P=pitch)

Moreover, in the present invention, it is preferable that the above-mentioned rotating layer is formed by fixing a chiral nematic liquid crystal. Since the chiral nematic liquid crystal is used, a cholesteric structure with the twist angle and the pitch in the above-mentioned ranges can easily be formed.

The present invention provides a liquid crystal display device comprising a liquid crystal cell, a polarizer disposed on a display side of the liquid crystal cell, and an optical rotation plate disposed on a display side of the polarizer and having a function of rotating the polarization axis of linear polarization transmitted the polarizer, wherein the optical rotation plate further comprises a transparent substrate, and an optical rotation layer formed on the transparent substrate and containing a rod-shaped compound for forming a cholesteric structure, and the cholesteric structure has a 90 degrees or larger twist angle and a pitch in a range of 450 nm to 4,000 nm.

According to the present invention, since an optical rotation plate having an optical rotation layer of the cholesteric structure formed with the twist angle larger than 90 degrees and the pitch in a range of 450 nm to 4,000 nm is used, a liquid crystal display device enabling observation of a bright image even in a state with the polarizing glasses put on can be obtained.

Also, the present invention provides a liquid crystal display device comprising a liquid crystal cell, a polarizer disposed on the display side of the liquid crystal cell, and an optical conversion layer disposed on the display side of the polarizer and having a function of converting linear polarization transmitted the polarizer into elliptical polarization.

According to the present invention, since the above-mentioned optical conversion layer is used so that the above-mentioned polarizer has the function of converting transmitted linear polarization into elliptical polarization, an image visually recognized in a specific direction corresponding to the longer axis direction of the elliptical polarization can be provided brighter than in the other directions. Therefore, according to the present invention, for example by aligning the longer axis of the elliptical polarization with the vertical direction, a liquid crystal display device enabling bright visual observation in an ordinary state with the polarization glasses put on can be obtained.

From these aspects, according to the present invention, a liquid crystal display device enabling bright visual observation even in a state with the polarizing glassed put on can be obtained.

In the present invention, it is preferable that the above-mentioned optical conversion layer has the function of converting the linear polarization transmitted the above-mentioned polarizer into elliptical polarization with a longer axis direction provided in a direction different from that of a polarization transmission axis of the above-mentioned polarizer. It is particularly preferable that it has a function of converting the same into elliptical polarization with the longer axis direction in a substantially vertical direction. Thereby, brighter visual recognition can be enabled in a state with the polarizing glasses put on.

Moreover, in the present invention, it is preferable that the above-mentioned optical conversion layer contains a rod-shaped compound for forming the cholesteric structure. Since such an optical conversion layer can be disposed in an optional direction without the need of controlling the disposing orientations with each other at the time of disposing the same in combination with the above-mentioned polarizer, by use of such an optical conversion layer, the liquid crystal display device of the present invention can be produced by simple steps.

Furthermore, the longer axis orientation of the elliptical polarization after conversion of the linear polarization transmitted the polarizer into the elliptical polarization by the above-mentioned optical function layer can easily be controlled optionally.

Thereby, the function of converting the linear polarization into the elliptical polarization or the function of rotating the polarization transmission axis of the above-mentioned optical conversion layer can easily be adjusted.

Moreover, in the present invention, it is preferable that the above-mentioned optical conversion layer is formed by fixing a chiral nematic liquid crystal.

Furthermore, in the present invention, it is preferable that the selective reflection wavelength of the above-mentioned optical conversion layer is 750 nm or more. Thereby, the efficiency of converting the linear polarization transmitted the above-mentioned polarizer into the elliptical polarization is improved in the above-mentioned optical conversion layer so that brighter observation is enabled in the liquid crystal display device of the present invention in a state with the polarizing glassed put on. Moreover, since the selective reflection wavelength is outside the visible light region, contrast decline derived from coloring by the external light or reflection of the display light can be prevented.

In the present invention, it is preferable that the polarization transmission axis of the above-mentioned polarizer is inclined to the left side with respect to the vertical direction as viewed from the display side and the rotation direction of the above-mentioned cholesteric structure is the rightward rotation, or that the polarization transmission axis of the above-mentioned polarizer is inclined to the right side with respect to the vertical direction as viewed from the display side and the rotation direction of the above-mentioned cholesteric structure is the leftward rotation. Thereby, the thickness of the optical conversion layer in the present invention can further be made thinner.

Moreover, in the present invention, it is preferable that the above-mentioned optical conversion layer may convert the above-mentioned linear polarization into an elliptical polarization with the ellipticity in a range of 0.006 to 0.8. Since the ellipticity after the conversion by the optical conversion layer is in a range of 0.006 to 0.8, a liquid crystal display device enabling bright visual recognition even in a state with the polarizing glasses put on can be obtained.

Effects of the Invention

The optical rotation plate of the present invention provides the effect of realizing a desired rotation angle while hardly generating variation in the rotation angle of the polarization specializing axis of the linear polarization.

Moreover, the liquid crystal display device of the present invention provides the effect of enabling observation of a bright image even in a state with polarization glasses put on.

BRIEF DESCRIPTION OF THE DRAWINGS

FIG. 10 is a table showing the relationship among the chiral agent addition amount, the pitch and the twist angle;

DESCRIPTION OF THE PREFERRED EMBODIMENTS

The present invention relates to an optical rotation plate, and a liquid crystal display device using the same.

Hereafter, the optical rotation plate and the liquid crystal display device of the present invention will be described successively.

A. Optical Rotation Plate

First, the optical rotation plate of the present invention will be described. As mentioned above, the optical rotation plate of the present invention comprises a transparent substrate, and an optical rotation layer containing a rod-shaped compound for forming a cholesteric structure, formed on the above-mentioned transparent substrate so as to provide a function of rotating the polarization axis of a transmitted linear polarization, wherein the above-mentioned cholesteric structure has a twist angle of 90 degrees of more and a pitch in a range of 450 nm to 4,000 nm.

Figure 1:
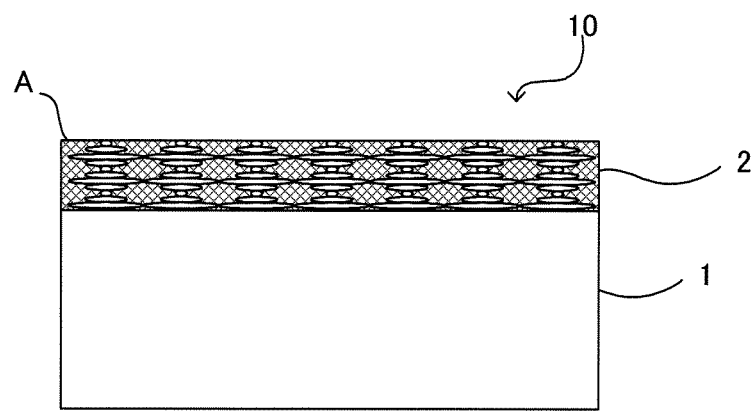
FIG. 1 is a schematic cross-sectional view showing an example of an optical rotation plate of the present invention.

Such an optical rotation plate of the present invention will be described with reference to the drawings. FIG. 1 is a schematic cross-sectional view showing an example of an optical rotation plate of the present invention. As it is exemplified in FIG. 1, the optical rotation plate 10 of the present invention comprises a transparent substrate 1, and an optical rotation layer 2 formed on the above-mentioned transparent substrate 1 and containing a rod-shaped compound A for forming a cholesteric structure, and has a function of rotating the polarization axis of a linear polarization transmitted the optical rotation plate 10.

In such an example, the optical rotation plate 10 of the present invention has the above-mentioned cholesteric structure, formed by the rod-shaped compound A in the above-mentioned optical rotation layer 2, having a twist angle of larger than 90 degrees and a pitch in a range of 450 nm to 4,000 nm.

According to the present invention, since the above-mentioned optical rotation layer contains a rod-shaped compound for forming a cholesteric structure, the polarization axis of the linear polarization transmitting the optical rotation plate of the present invention can be rotated. Since the twist angle of the cholesteric structure is larger than 90 degrees and its pitch is in a range of 450 nm to 4,000 nm, the polarization axis of the linear polarization transmitting the optical rotation plate of the present invention can be rotated independently of the twist angle of the above-mentioned cholesteric structure. Therefore, since the polarization axis is not rotated along the twist angle of the cholesteric structure in the present invention, even in the case variation is generated in the twist angle of the above-mentioned cholesteric structure, generation of variation in the rotation angle of the polarization axis can be remarkably reduced.

That is, since the conventional optical rotation plate rotates the polarization axis of the linear polarization along the twist angle of the liquid crystal material, the rotation angle of the polarization axis of the linear polarization to be rotated by the optical rotation plate coincides with the twist angle of the liquid crystal material. Therefore, in order to realize a desired rotation angle, strict and highly precise control of the twist angle of the liquid crystal material has been regarded necessary. However, since the highly precise control of the twist angle is difficult, if such an optical rotation plate is formed in a large area, variation of the twist angle is generated, and thereby variation is generated also in the rotation angle so that a problem arises in that observation of a homogeneous image is difficult in a state with polarizing glasses put on.

In this regard, according to the optical rotation plate of the present invention, since the twist angle and the pitch of the cholesteric structure in the above-mentioned optical rotation layer are in the above-mentioned ranges, the polarization axis of the linear polarization can be rotated independently of the cholesteric structure in the present invention. That is, the polarization axis can be rotated in an aspect without having the twist angle of the cholesteric structure and the rotation angle of the linear polarization coincide with each other. Accordingly, since the polarization axis is not rotated along the twist angle of the cholesteric structure in the present invention, even in the case variation is generated in the twist angle of the above-mentioned cholesteric structure, generation of variation in the rotation angle of the polarization axis can be remarkably reduced.

Moreover, in the present invention, since the twist angle of the cholesteric structure and the rotation angle of the polarization specializing axis do not coincide with each other, a desired rotation angle can be realized by adjusting the thickness of the optical rotation layer.

As heretofore mentioned, according to the present invention, an optical rotation plate easily realizing a desired rotation angle and hardly generating variation in the rotation angle of the optical rotation axis can be obtained.

The optical rotation plate of the present invention comprises at least a transparent substrate and an optical rotation layer. As needed, it may have another optical configuration.

Hereafter, each configuration used in the present invention will be described successively.

1. Optical Rotation Plate

First, the optical rotation layer used in the present invention will be described. The optical rotation layer used in the present invention contains a rod-shaped compound for forming a cholesteric structure and provides a function of rotating the polarization axis of the linear polarization to the optical rotation plate of the present invention. The optical rotation layer used in the present invention has a twist angle of the above-mentioned cholesteric structure of larger than 90 degrees and a pitch in a range of 450 nm to 4,000 nm.

In the optical rotation layer used in the present invention, the pitch of the cholesteric structure formed by the above-mentioned rod-shaped compound is not particularly limited as long as it is in the range mentioned above. Here, in the present invention, the pitch of the above-mentioned cholesteric structure is in the above-mentioned range because with the pitch of the cholesteric structure larger than the above-mentioned range, the polarization axis of the linear polarization is rotated, coinciding with the twist angle of the cholesteric structure as in the case of the conventional optical rotation plate so that the object of the present invention cannot be achieved. Moreover, if it is smaller than the above-mentioned range, the polarization axis of the linear polarization is not rotated so that the object of the present invention cannot be achieved.

Here, as to the pitch of the above-mentioned cholesteric structure, if a light is incident parallel to the helical axis of the cholesteric structure, a light of a specific wavelength $\lambda$ to be determined uniformly by the helical pitch of the liquid crystal is scattered and reflected selectively. Since $\lambda$ and the pitch have the relationship represented by formula (1), by measuring $\lambda$ with a spectroscope (such as a ultraviolet visible near infrared spectrophotometer UV-3100PC® (produced by Shimadzu Corporation)), a pitch can be calculated using the formula (1) to about 0.25 to 1.6 µm. Moreover, the average refractive index can be measured using Abbe refractometer (produced by Atago Co., Ltd.) or Ellipsometer (produced by J. A. Woollam Co., Inc.). For the measurement of a longer pitch, a wedge method of Cano is used. Details of the measurement method are mentioned in "T. Inukai, K. Furukawa, H. Inoue and K. Terashima: Mol. Cryst. Liq. Cryst., 94 (1983) 109". The range of the pitch measured by the measurement method is about 1 to 400 µm.

Figure 6:
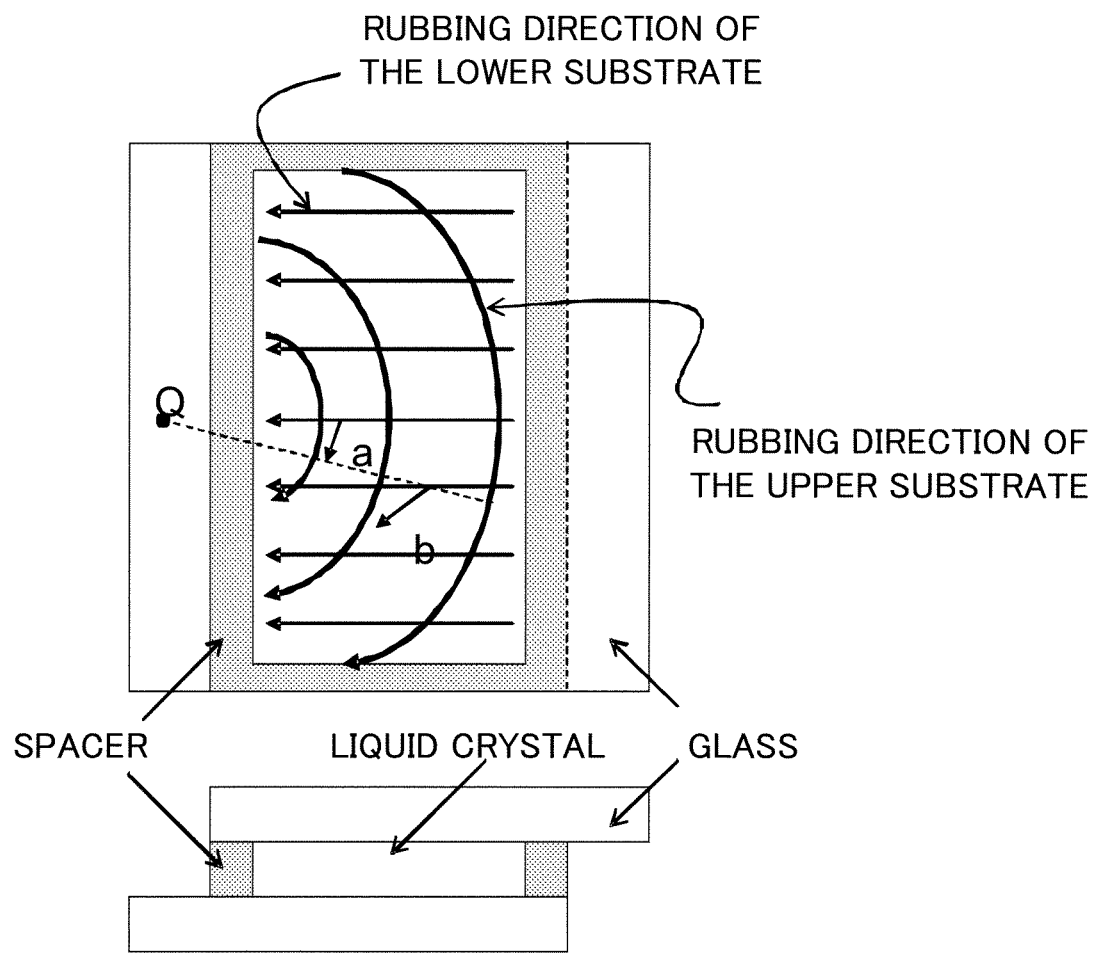
FIG. 6 is a schematic diagram for describing the pitch measuring method in a cell with the twist angle changed continuously.

Moreover, as in the case of adding a minute amount of a cholesteric liquid crystal or of a chiral substance to a nematic material, if the pitch is a multiple of more of the cell gap, the pitch can be measured with a method shown in "M. A. Osman: Mol. Cryst. Liq. Cryst, 82 (Letters) (1982) 295". That is, as shown in FIG. 6, by rubbing the lower substrate surface parallel in one direction and rubbing the upper substrate surface concentrically with the point Q provided as the center, the twist angle "b" is changed continuously depending on the position in the cell. By introducing a liquid crystal of a pitch P into the cell, disclination is generated at a position shown by the broken line in FIG. 6 for example. This corresponds with a straight line passing on the point Q so that the angle "b" formed by the rubbing directions of the upper and lower substrates on the straight line is represented by: b=a+($\pi$/2) . . . formula (2). The letter "a" is the angle formed by the broken line and the rubbing direction of the lower substrate. In this case, the disclination is a boundary of the regions of the rightward and leftward twisted orientations so that by measuring the value "a", the pitch can be obtained by the formula (3).

$$P=2\pi d/a \qquad \text{formula (3)}.$$

(d=cell gap)

Figure 7:
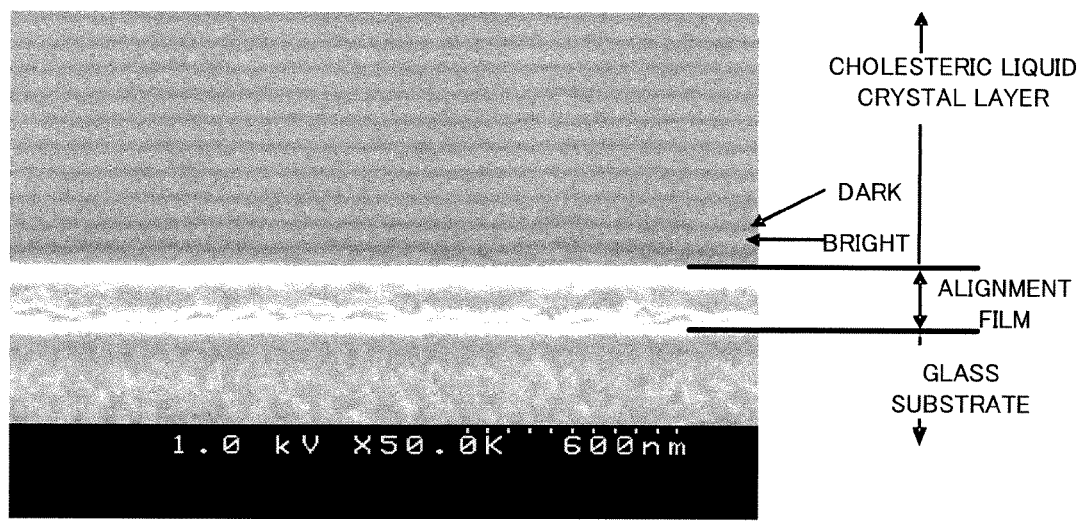
FIG. 7 is a photograph of a cholesteric liquid crystal cross section by the SEM.

In addition to these measuring methods, the pitch of the cholesteric structure can be found also from the cholesteric liquid crystal cross section observation with a scanning electron microscope (SEM) or a transmission electron microscope photograph (TEM). For example, FIG. 7 shows a cholesteric liquid crystal cross section photograph with a SEM. In FIG. 7, the bright and dark pattern in the cholesteric liquid crystal layer shown in FIG. 7 is due to the difference in the liquid crystal material director direction illustrated in FIG. 8. Therefore, the pitch can be obtained from the 5 layer (dark, bright, dark, bright, dark, or bright, dark, bright, dark, bright) distance, the pitch can be found.

The pitch of the cholesteric structure in the optical rotation layer is not particularly limited as long as it is in the above-mentioned range. Therefore, the pitch of the cholesteric structure can be suitably determined depending on factors such as the rotation angle required to the optical rotation plate and other functions to be provided to the optical rotation plate, according to the application of the optical rotation plate of the present invention, and the like. In particular, the pitch of the cholesteric structure in the present invention is more preferably in a range of 500 nm to 2,000 nm, and it is further preferably in a range of 550 nm to 1,500 nm. Since the pitch is in the range, it can be produced even in the case one side of the optical rotation plate is the air interface so as to facilitate the production process, and thus it is advantageous.

Moreover, the cholesteric structure has the selective reflection properties of selectively reflecting a light of a wavelength corresponding to its pitch. Therefore, in the present invention, by suitably adjusting the pitch of the above-mentioned cholesteric structure in the above-mentioned range, a function of selectively reflecting a light of a predetermined wavelength can be provided to the optical rotation plate. From this viewpoint, it is preferable that the pitch of the above-mentioned cholesteric structure does not include a visible light region. More specifically, it is preferable that the pitch of the above-mentioned cholesteric structure does not correspond to a range of 300 nm to 450 nm. If the pitch of the cholesteric structure corresponds to the visible light region, for example in the case of using the optical rotation plate of the present invention for a liquid crystal display device, the display quality may be deteriorated due to change of the color nuance of the image, and the like.

Moreover, since the cholesteric structure has the above-mentioned selective reflection properties, the pitch of the cholesteric structure in the present invention is preferably in a range of 450 nm to 1,350 nm. Since the pitch of the cholesteric structure in the present invention is in the above-mentioned range, the optical rotation plate of the present invention can be provided with a function of reflecting a heat ray in addition to the rotary polarization of rotating the polarization axis of the linear polarization. The optical rotation plate of the present invention with the cholesteric structure formed with such a pitch is advantageous in that the panel endurance can be improved by reflecting the heat ray in addition to the advantage of enabling observation even in a state with polarization glasses put on in the case of being used for a liquid crystal display device.

Moreover, the twist angel of the above-mentioned cholesteric structure in the present invention is not particularly limited as long as twisted angle is in a range larger than 90 degrees so that it can be suitably determined according to factors such as the kind of the rod-shaped compound used for the optical rotation layer and the rotary polarization provided to the optical rotation plate of the present invention. In particular, the twist angle of the cholesteric structure in the present invention is preferably in a range of 91 degrees to 43,200 degrees, it is more preferably in a range of 180 degrees to 25,200 degrees, and it is further preferably in a range of 360 degrees to 7,200 degrees. Here, since the optical polarization angle of the present invention has the characteristics that a cholesteric layer with the selective reflection wavelength $\lambda$ on the longer wavelength side has a larger optical polarization angle out of those having the same twist angle in the case of the same liquid crystal material, and a cholesteric layer having a larger birefringence $\Delta n$ ($=ne-no$) has a larger optical polarization angle out of those having the same twist angle in the case of different liquid crystal materials, the twist angle may be adjusted depending on a needed optical rotation angle according to the selective reflection wavelength and the birefringence $\Delta n$ of the cholesteric liquid crystal to be used.

Here, "ne" and "no" each denote a refractive index of an ordinary light and an extraordinary light with the vibration direction of the electric spectrum of the light orthogonal to and parallel with the optical axis of the liquid crystal material.

Figure 8:
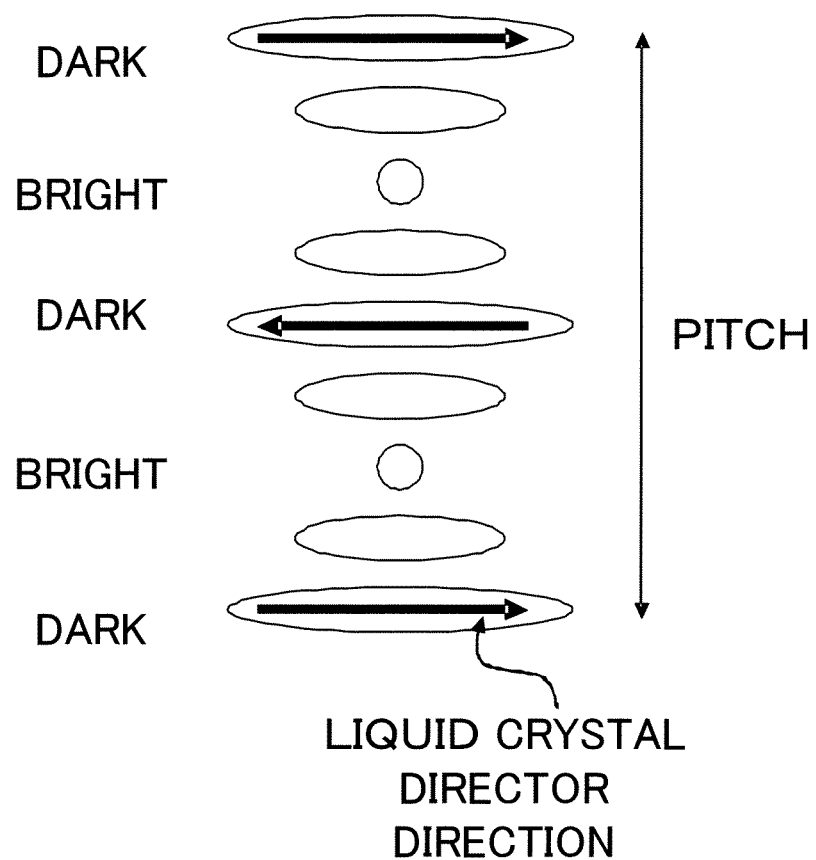
FIG. 8 is a schematic diagram of the photograph of a cholesteric liquid crystal cross section.

The above-mentioned twist angle in the present invention can be calculated from the pitch length and the film thickness. As shown in FIG. 8, since 1 pitch is 360 degrees, it is calculated from the following formula (4).

$$\text{Twist angle} = 360 \times d/P \quad \text{formula (4)}$$

(d=film thickness, P=pitch)

For example, in the case the film thickness of a cholesteric liquid crystal with the pitch calculated by the above-mentioned evaluation method of 1,010 nm is 2.0 μm, the twist angle is calculated from formula (4) to be 713 degrees.

The thickness of the optical rotation layer used in the present invention is not particularly limited as long as it is in a range capable of providing a desired rotary polarization to the optical rotation plate of the present invention by forming the optical rotation layer. Here, as mentioned above, according to the optical rotation plate of the present invention, since the twist angle of the above-mentioned cholesteric structure and the rotation angle of the polarization axis to be rotated do not coincide with each other, the rotary polarization in the optical rotation layer is determined according to the pitch of the above-mentioned cholesteric structure and the thickness of the optical rotation layer. In other words, the rotation angle by the optical rotation plate of the present invention can be suitably adjusted by adjusting the thickness of the optical rotation layer. This means that the rotation angle can be adjusted extremely easily compared with a case of the conventional optical rotation plate, where the twist angle of the above-mentioned cholesteric structure and the rotation angle of the polarization axis to be rotated coincide with each other, incapable of realizing a desired rotation angle unless the twist angle is controlled strictly and highly precisely.

Accordingly, the thickness of the optical rotation layer used in the present invention can be suitably adjusted for providing desired rotating properties according to a factor such as the pitch of the above-mentioned cholesteric structure. In particular, it is preferably in a range of 0.25 μm to 120 μm, it is more preferably in a range of 0.5 μm to 70 μm, and it is further preferably in a range of 1 μm to 20 μm.

Then, the rod-shaped compound used for the optical rotation layer will be described. The rod-shaped compound used in the present invention is not particularly limited as long as it has the refractive index anisotropy and it is capable of providing a desired rotary polarization by forming a cholesteric structure in the above-mentioned optical rotation layer. In particular, as the rod-shaped compound used in the present invention, those having a polymerizable functional group in a molecule can be used preferably, and furthermore, those having a three-dimensionally cross-linkable polymerizable functional group can be used more preferably. Since the above-mentioned rod-shaped compound has a polymerizable functional group, the above-mentioned rod-shaped compound can be fixed by polymerization so that the optical rotation layer used in the present invention hardly has the change of the rotary polarization generated over time.

Moreover, in the present invention, the above-mentioned rod-shaped compound having a polymerizable functional group and the above-mentioned rod-shaped compound without a polymerizable functional group may be used as a mixture.

The "three-dimensional cross-linking" mentioned above denotes three-dimensional polymerization of liquid crystalline molecules with each other so as to have a state with a mesh (network) structure.

As the above-mentioned polymerizable functional group, for example, a polymerizable functional group to be polymerized by an ionizing radiation such as an ultraviolet ray and an electron beam or by the function of heat can be presented.

Representative examples of the polymerizable functional group include a radically polymerizable functional group and a cationically polymerizable functional group. Furthermore, representative examples of the radically polymerizable functional group include a functional group having at least one ethylenically unsaturated double bond capable of addition polymerization. Specifically, a vinyl group with or without a substituent, an acrylate group (general term including an acryloyl group, a methacryloyl group, an acryloyloxy group, and a methacryloyloxy group), and the like can be presented. Moreover, specific examples of the above-mentioned cationically polymerizable functional group include an epoxy group. Additionally, as the polymerizable functional group, for example, an isocyanate group and an unsaturated triple bond can be presented. Among these examples, in terms of the process, a functional group having an ethylenically unsaturated double bond can be used preferably.

Moreover, the rod-shaped compound used in the present invention is preferably a liquid crystalline material showing liquid crystal properties. Since the liquid crystalline material has a large refractive index anisotropy, a desired rotary polarization can easily be provided to the optical rotation layer.

As a specific example of the rod-shaped compound used in the present invention, a compound represented by the following chemical formulae (1) to (6) can be exemplified.

[Chemical formula 1]

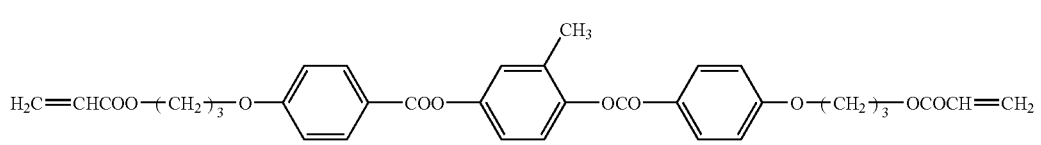

(1)

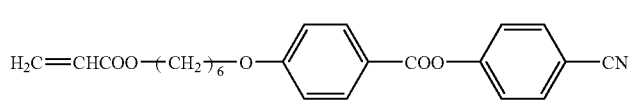

(2)

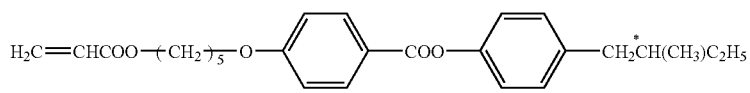

(3)

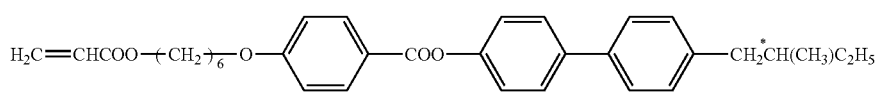

(4)

(5)

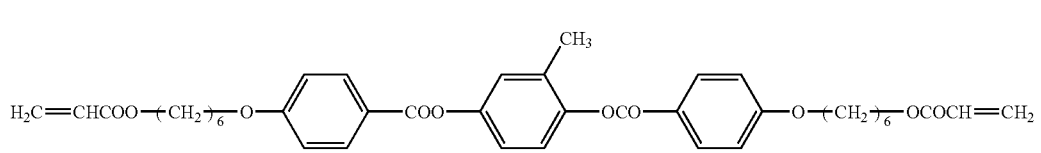

(6)

Here, the liquid crystalline materials represented by the chemical formulae (1), (2), (5) and (6) can be prepared according to the methods disclosed in Makromol. Chem. 190, 3201-3215 (1989) by D. J. Broer, et al. or Makromol. Chem. 190, 2255-2268 (1989) by D. J. Broer, et al. or a method similar thereto. Moreover, preparation of the liquid crystalline materials represented by the chemical formulae (3) and (4) is disclosed in DE195,04,224.

Moreover, as the specific examples of a nematic liquid crystalline material having an acrylate group at the end, those represented by the following chemical formulae (7) to (17) can be exemplified.

[Chemical formula 2]

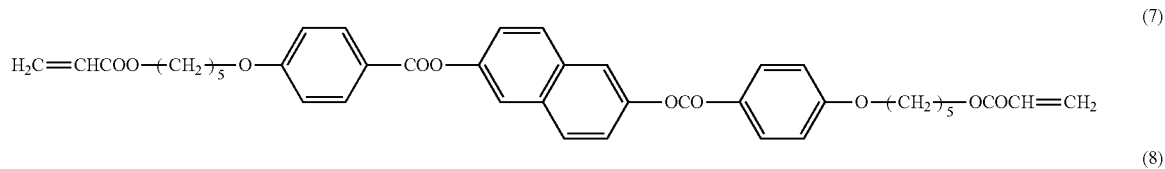

(7)

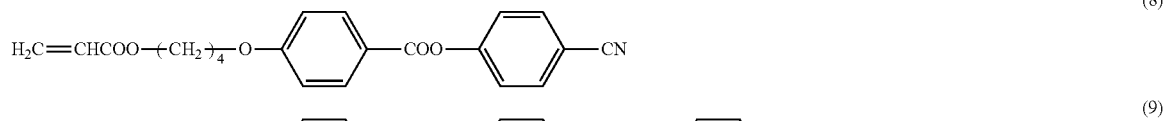

(8)

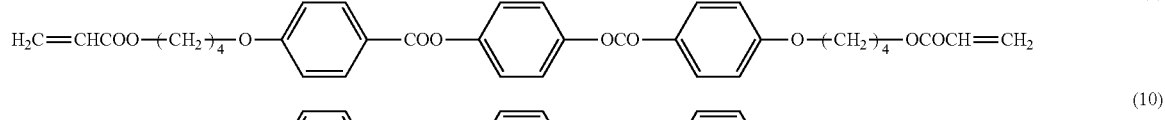

(9)

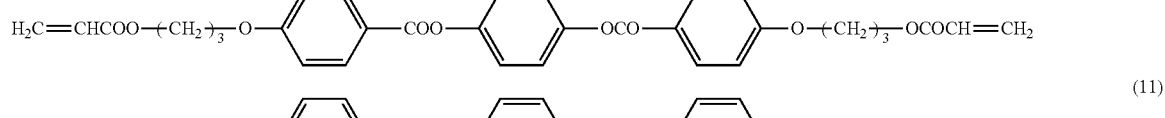

(10)

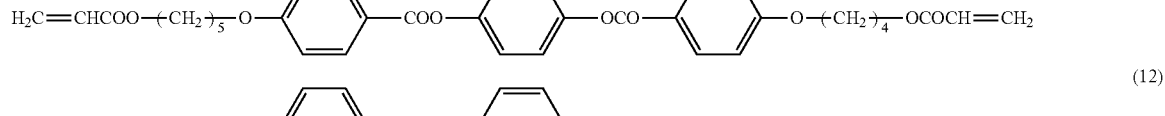

(11)

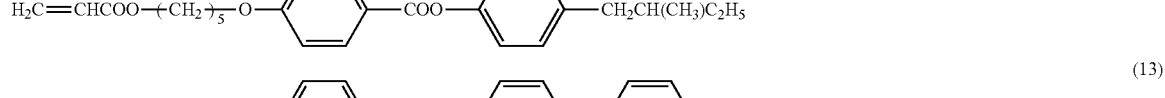

(12)

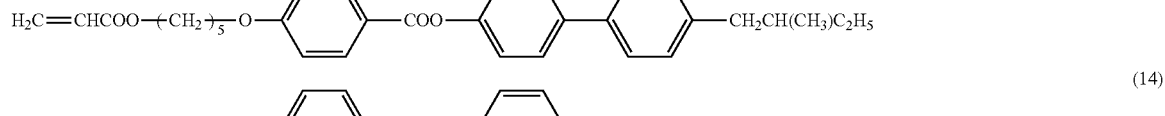

(13)

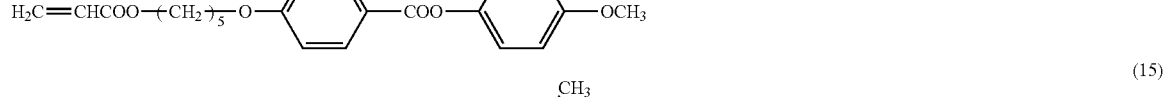

(14)

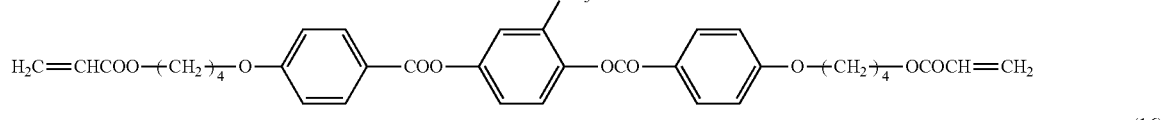

(15)

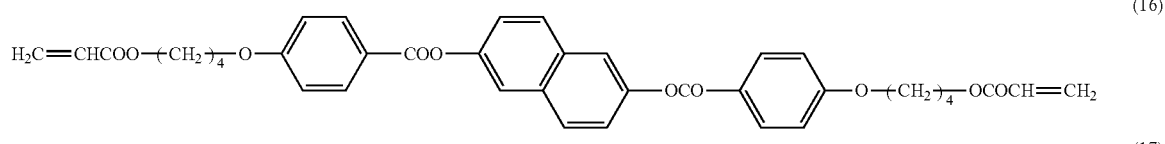

(16)

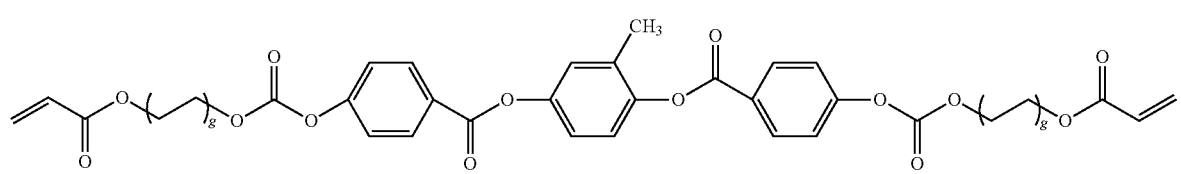

(17)

g: an integer of 2 to 5

Furthermore, as the rod-shaped compound used in the present invention, a compound represented by the following chemical formula (18) disclosed in SID 06 DIGEST 1673-1676) can be presented.

[Chemical formula 3]

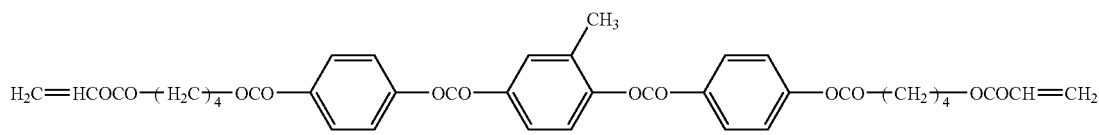

(18)

In the present invention, the above-mentioned rod-shaped compound may be used by one kind alone or as a mixture of two or more kinds. For example, use of a liquid crystalline material having one or more polymerizable functional group at both ends and a liquid crystalline material having one or more polymerizable functional group at one end as a mixture for the above-mentioned rod-shaped compound is preferable because the polymerization density (cross-linking density) and the optical characteristics can be suitably adjusted according to adjustment of the composition ratio thereof.

In the present invention, an optical rotation layer using either of the above-mentioned rod-shaped compounds can be used preferably. In particular, use of an optical rotation layer using a rod-shaped compound showing nematic liquid crystalline properties with the rod-shaped compound used in combination with a chiral agent is preferable. Since such an optical rotation layer is made of a chiral nematic liquid crystal fixed, easy control of the rotary polarization of the above-mentioned optical rotation layer can be facilitated.

The above-mentioned chiral agent is not particularly limited as long as it enables a predetermined cholesteric arrangement of the rod-shaped compound. As the chiral agent used in the present invention, for example, a low molecular compound having an axis asymmetry in a molecule as those represented by the following general formulae (19), (20) or (21) can be used preferably.

[Chemical formula 4]

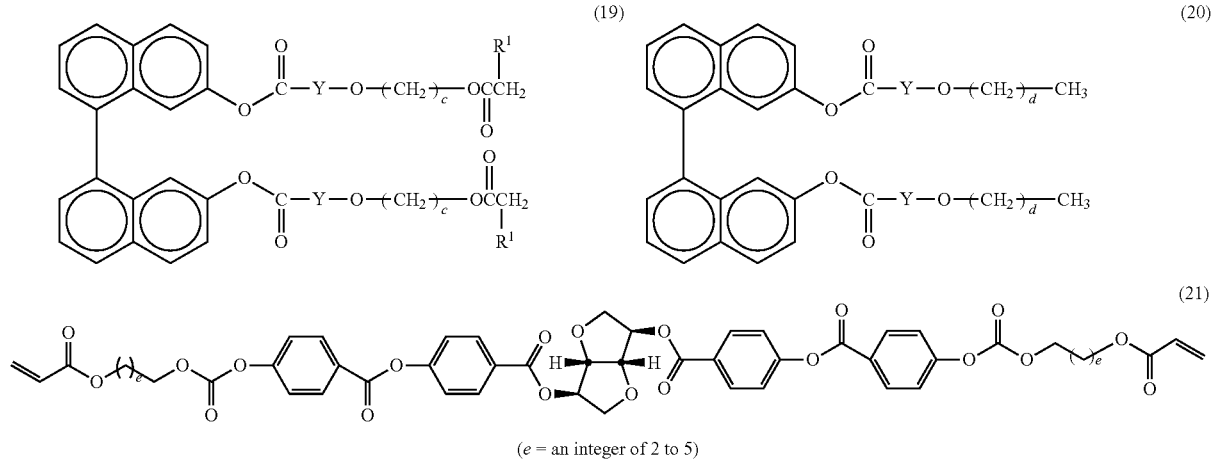

($e$ = an integer of 2 to 5)

[Chemical formula 5]

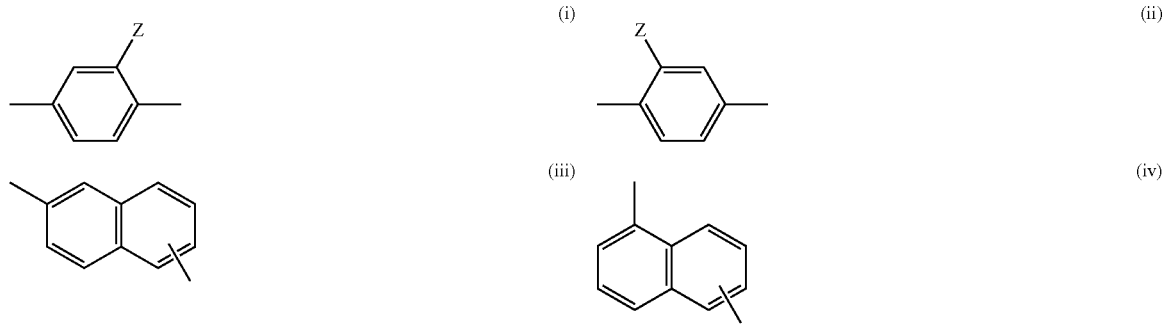

(v) 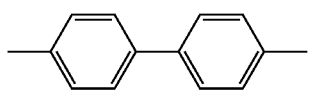

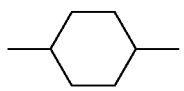

(vi) 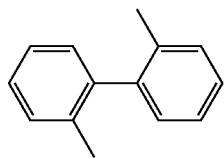

(vii)

[Chemical formula 6]

(viii) 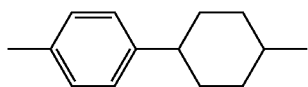

(ix) 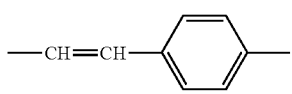

(x) 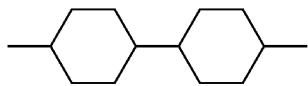

(xi) 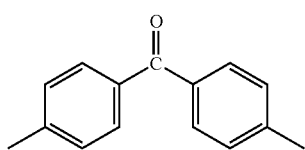

(xii) 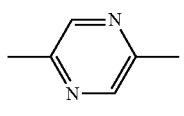

(xiii) 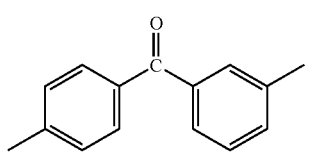

(xiv) 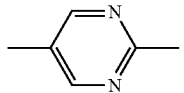

(xv)

(xvi)

(xvii)

(xviii)

(xix)

(xx)

(xxi) 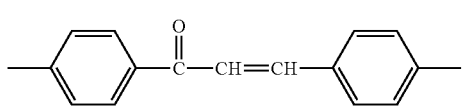

(xxii)

(xxiii) 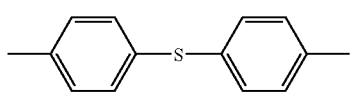

(xxiv)

In the above-mentioned general formula (19) or (20), $R^1$ is hydrogen or a methyl group. Y is an optional one out of the above-mentioned formulae (i) to (xxiv), in particular, it is preferably either one of the formulae (i), (ii), (iii), (v) and (vii). Moreover, "c" and "d" representing the chain length of the alkylene group may each independently an optional integer in a range of 2 to 12, and it is preferably in a range of 4 to 10, and it is further preferably in a range of 6 to 9.

Moreover, as the chiral agent used in the present invention, those represented by the following chemical formula can also be used.

[Chemical formula 7]

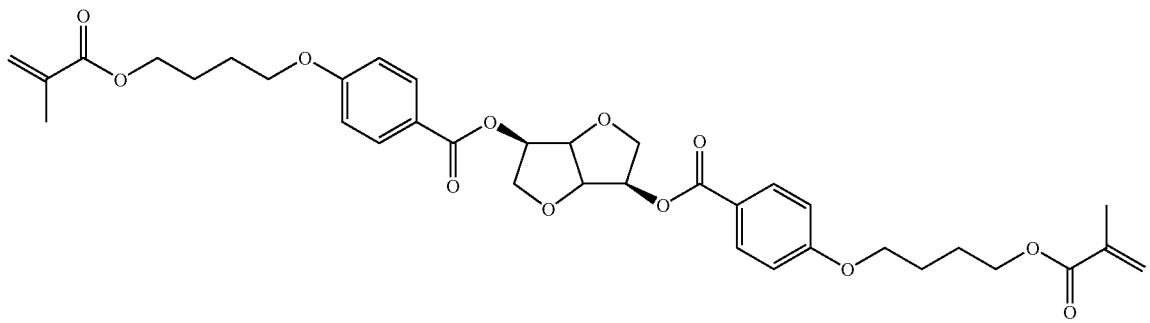

2. Transparent Substrate

Then, the transparent substrate used for the optical rotation plate of the present invention will be described. The transparent substrate used in the present invention is not particularly limited as long as it supports the above-mentioned optical rotation layer. In particular, the transparent substrate used in the present invention preferably has a transmittance in the visible light region of 80% or more, and it further preferably has that of 90% or more. Here, the transmittance of the transparent substrate can be measured by the JIS K7361-1 (testing method for the total light transmittance of a plastic-transparent material).

As the transparent substrate used in the present invention, as long as the above-mentioned transparency is provided, either a flexible material having flexibility or a rigid material without flexibility can be used. In particular, in the present invention, it is preferable to use a flexible material.

Examples of the above-mentioned flexible material include base materials made of a cellulose derivative, a cycloolefin polymer, an acrylic resin such as polymethyl methacrylate, polyethylene terephthalate, polypropylene terephthalate, polybutylene terephthalate, polyethylene naphthalate, polypropylene naphthalate, polyester such as polyallylate, polyvinyl alcohol, polyimide, polysulfone, polyether sulfone, amorphous polyolefin, a modified acrylic polymer, polystyrene, an epoxy resin, or polycarbonate. In particular, in the present invention, it is preferable to use a transparent substrate made of cellulose derivative or a cycloolefin polymer.

As the above-mentioned cellulose derivative, it is preferable to use a cellulose ester. Furthermore, among the cellulose esters, it is preferable to use cellulose acylates. Since the cellulose acylates are widely used industrially, it is advantageous in terms of the accessibility convenience.

As the above-mentioned cellulose acylates, it is preferable to use a lower fatty acid ester having 2 to 4 carbon atoms. Such a lower fatty acid ester may include only a single lower fatty acid ester such as cellulose acetate or it may include a plurality of fatty acid esters such as cellulose acetate butylate and cellulose acetate propionate.

In the present invention, among the above-mentioned lower fatty acid esters, cellulose acetate can be used particularly preferably. Moreover, among the cellulose acetates, it is most preferable to use triacetyl cellulose having 57.5 to 62.5% average acetylation degree (substitution degree: 2.6 to 3.0). Here, the acetylation degree denotes the bonded acetic acid amount per cellulose unit mass. The acetylation degree can be obtained by measurement and calculation of the acetylation by the ASTM: D-817-91 (testing method for cellulose acetate, and the like). The acetylation degree of the triacetyl cellulose constituting a triacetyl cellulose film can be obtained by the above-mentioned method after removing the impurities included in the film such as a plasticizer.

On the other hand, the cycloolefin polymer used in the present invention is not particularly limited as long as it is a resin having a unit of a monomer including cyclic olefin (cycloolefin). As such a monomer including a cyclic olefin mentioned above, for example, norbornene and a polycyclic norbornene monomer can be presented.

As the cycloolefin polymer used in the present invention, either cycloolefin polymer (COP) or cycloolefin copolymer (COC) can be used preferably.

The cycloolefin polymer used in the present invention may be a single polymer including a monomer of the above-mentioned cyclic olefin or a copolymer.

Specific examples of the base material including a cycloolefin polymer used in the present invention include Topas® manufactured by Ticona Corp., Arton® manufactured by JSR Corporation, ZEONOR® manufactured by Nippon Zeon Corporation, ZEONEX® manufactured by Nippon Zeon Corporation, Apel® manufactured by Mitsui Chemical Inc., and those produced by applying a drawing process to these base materials.

3. Production Method for the Optical Rotation Plate

Figure 9:
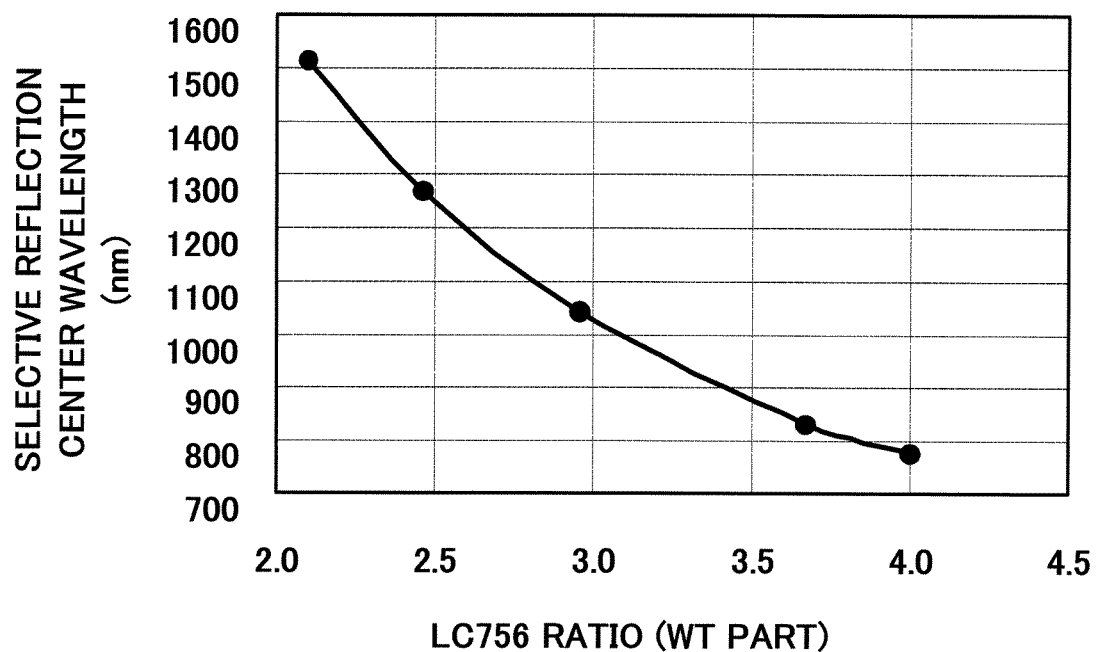
FIG. 9 is a graph showing the relationship between the chiral agent addition amount and the selective reflection center wavelength.

The optical rotation plate of the present invention can be produced by forming an optical rotation layer on the transparent substrate. As the above-mentioned forming method of the optical rotation layer, in general, a method of applying an optical rotation layer forming coating solution containing a rod-shaped compound and a chiral agent onto the above-mentioned transparent substrate, and, as needed, applying a hardening process such as an ultraviolet ray irradiation to the coating film is used. As mentioned above, in the optical rotation layer of the present invention which has the pitch and the twist angle of the cholesteric structure formed with the rod-shaped compound in the above-mentioned ranges, such a cholesteric structure can be formed by suitably adjusting the content ratio of the rod-shaped compound and the chiral agent in the above-mentioned optical rotation layer forming coating solution, and the thickness of the optical rotation layer. Here, the pitch and the twist angle of the cholesteric structure to be formed depend on factors such as the rod-shaped compound and the kind of the chiral agent. For example, in the case of using a liquid crystalline monomer molecule having polymerizable acrylate at both ends and a spacer between mesogen at the center portion and the above-mentioned acrylate (Paliocolor (registered trademark) LC1057 (manufactured by BASF Corp.)) and a chiral agent molecule having polymerizable acrylate at both side ends (Paliocolor (registered trademark) LC756 (manufactured by BASF Corp.)), the relationship between the content ratio of the chiral agent, addition amount and pitch is as shown in FIG. 9. Moreover, the relationship between the thickness of the optical rotation layer and the twist angle is as shown in FIG. 10. Therefore, in the present invention, target twist angle and pitch can be achieved by adjusting the kind and the addition amount of the rod-shaped compound and the chiral agent, and the thickness of the optical rotation layer.

4. Application of the Optical Rotation Plate

Since the optical rotation plate of the present invention has a function of rotating the polarization axis of the linear polarization, it can be used for every application requiring such a function. Therefore, as the application of the optical rotation plate of the present invention, for example, a liquid crystal display device, a liquid crystal projector, and the like, can be presented.

B. Liquid Crystal Display Device

Then, the liquid crystal display device of the present invention will be described.

The liquid crystal display device of the present invention can be classified into two embodiments. Hereafter, each embodiment will be described independently.

I. First Embodiment

The liquid crystal display device of the first embodiment comprises a liquid crystal cell, a polarizer disposed on the display side of the above-mentioned liquid crystal cell, and an optical rotation plate disposed on the display side of the polarizer and having a function of rotating the polarization axis of linear polarization transmitted the above-mentioned polarizer, wherein the above-mentioned optical rotation plate further comprises a transparent substrate, and an optical rotation layer formed on the above-mentioned transparent substrate and containing a rod-shaped compound for forming a cholesteric structure, with the above-mentioned cholesteric structure having a twist angle of 90 degrees or larger and a pitch in a range of 450 nm to 4,000 nm.

Figure 2:
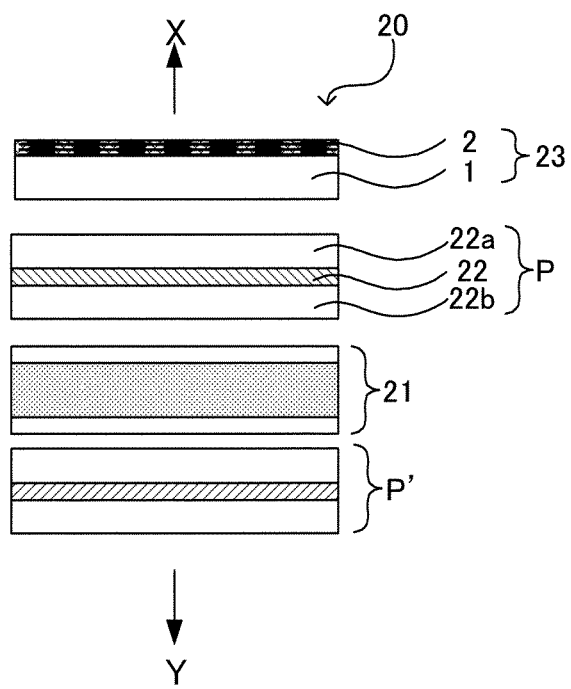
FIG. 2 is a schematic diagram showing an example of a liquid crystal display device of the present invention.

Such a liquid crystal display device of this embodiment will be described with reference to drawings. FIG. 2 is a schematic cross-sectional view showing an example of the liquid crystal display device of this embodiment. As illustrated in FIG. 2, a liquid crystal display device 20 of this embodiment comprises a liquid crystal cell 21, and a polarizer 22 disposed on the display side of the liquid crystal cell 21. Furthermore, the device 20 comprises an optical rotation plate 23 disposed on the further display side with respect to the above-mentioned polarizer 22 and having a function of rotating the polarization axis of a light transmitted the liquid crystal cell 21 and the polarizer 22 to be a linear polarization.

In such an example, the liquid crystal display device 20 of this embodiment comprises the above-mentioned optical rotation plate 23 which has a transparent substrate 1, and an optical rotation layer 2 formed on the above-mentioned transparent substrate 1 and containing a rod-shaped compound for forming a cholesteric structure. The above-mentioned cholesteric structure has a twist angle of 90 degrees of more and a pitch in a range of 450 nm to 4,000 nm.

As illustrated in FIG. 2, in the liquid crystal display device 20 of this embodiment, the polarizer 22 may be used as a polarizing plate P having a configuration with a polarizing plate protection film 22 (22a, 22b) disposed on both sides. Moreover, a polarizing plate P' including a polarizer on the backlight side of the liquid crystal cell 21 may be disposed.

Moreover, in FIG. 2, the X direction represents the display side and the Y direction the backlight side (the same is applied to the drawings hereafter).

Here, in this embodiment, the "display side" denotes the side where an observer of the liquid crystal display device observes an image displayed on the screen of the liquid crystal display device.

According to this embodiment, since an optical rotation plate having an optical rotation layer with a cholesteric structure formed with the twist angle larger than 90 degrees and the pitch in a range of 450 nm to 4,000 nm is used, a liquid crystal display device enabling observation of a bright image even in a state with the polarizing glasses put on can be obtained.

The liquid crystal display device of this embodiment includes at least a liquid crystal cell, a polarizer and an optical rotation plate, and as needed, other optional configurations may be provided.

Hereafter, each configuration used in this embodiment will be described successively.

1. Optical Rotation Plate

First, the optical rotation plate used in this embodiment will be described. The optical rotation plate used in this embodiment includes a transparent substrate, and an optical rotation layer formed on the above-mentioned transparent substrate and containing a rod-shaped compound for forming a cholesteric structure. The above-mentioned cholesteric structure has a twist angle of 90 degrees of more and a pitch in a range of 450 nm to 4,000 nm.

Here, since the optical rotation plate used in this embodiment is same as that described in the above-mentioned item of "A. Optical rotation plate", description is omitted here.

In the case of using an optical rotation plate for the liquid crystal display device of this embodiment, in general, the polarization axis direction after rotation by the optical rotation plate is disposed in the vertical direction. In the case of observing the liquid crystal display device in a state with polarizing glasses put on, only linear polarization having the vibration plane in the direction parallel with the polarization transmission axis of the polarizing glasses is observed. Since the polarizing glasses in general transmit only a light having the vibration plane in the vertical direction, if the polarization transmission axis of the polarizer disposed on the display side of the liquid crystal display device is in the horizontal direction, an image cannot be observed in a state with the polarizing glasses put on. Moreover, if the polarization transmission axis of the polarizer is in a direction inclined with respect to the vertical direction, an image observed in a state with the polarizing glasses put on may be dark.

Figure 3:
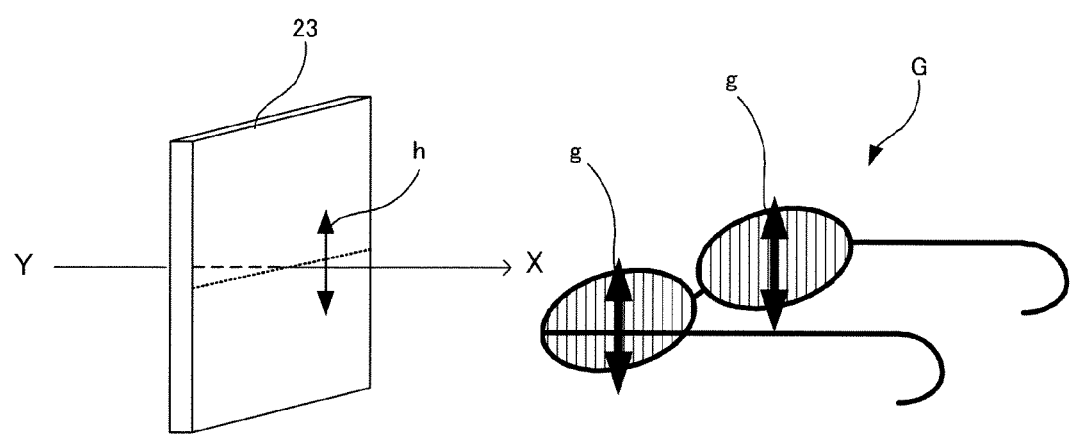
FIG. 3 is a schematic diagram showing an example of the effect of a liquid crystal display device of the present invention.

FIG. 3 is a schematic diagram for describing the reason why the polarization axis direction after conversion with the optical rotation plate is in the substantially vertical direction. As illustrated in FIG. 3, the polarization lenses used for the polarizing glasses G are disposed with the polarization transmission axis provided in the substantially vertical direction ("g" direction in the figure) in a state with the polarizing glasses put on. Therefore, since the polarization axis direction after conversion with the optical rotation plate 23 ("h" direction in the figure) is substantially in the vertical direction, the liquid crystal display device of this embodiment can be observed further brightly even in a state with the polarizing glasses put on.

The polarization axis rotating direction with the above-mentioned optical rotation plate is not particularly limited in this embodiment. In particular, in the case the polarization transmission axis of the polarizer used in this embodiment is inclined to the left side with respect to the vertical direction as viewed from the display side, the rotating direction of the above-mentioned cholesteric structure is preferably the rightward rotation. On the other hand, in the case the polarization transmission axis of the above-mentioned polarizer is inclined to the right side with respect to the vertical direction as viewed from the display side, the rotating direction of the above-mentioned cholesteric structure is preferably the leftward rotation. Accordingly, since the rotating direction of the optical rotation plate of this embodiment is determined according to the inclination of the polarization transmission axis of the polarizer as mentioned above, the rotation angle of the optical rotation axis to coincide with the polarization transmission axis of the vertical direction of the sunglasses can be made smaller. Moreover, the thickness of the optical rotation plate with a cholesteric structure formed can further be made smaller so that the thickness of the entire liquid crystal display device can further be made smaller particularly for the application requiring the thinness. Furthermore, productivity increase by simplification of the production process and cost reduction can be enabled by cutting back the use amount of the cholesteric liquid crystal material, which is a relatively expensive material.

Figure 4A:
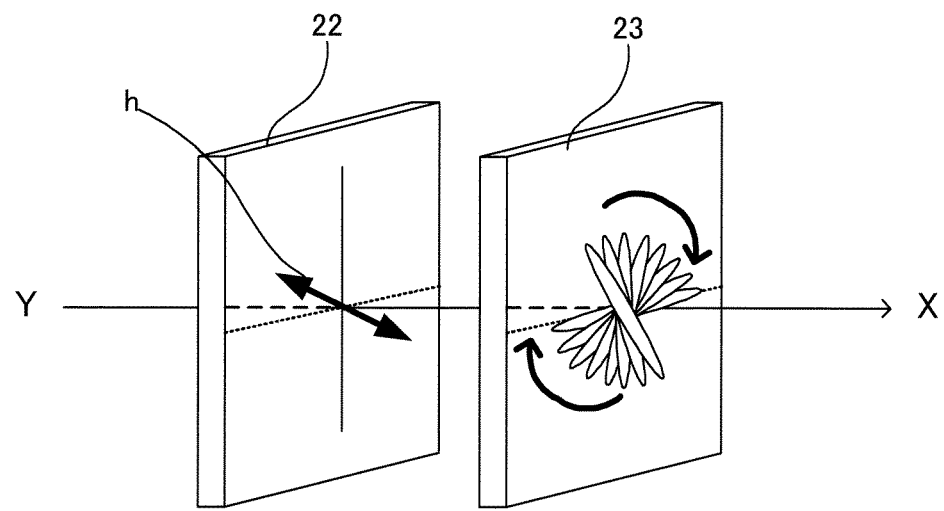
FIGS. 4A and 4B are each a schematic diagram showing another example of a liquid crystal display device of the present invention.
Figure 4B:
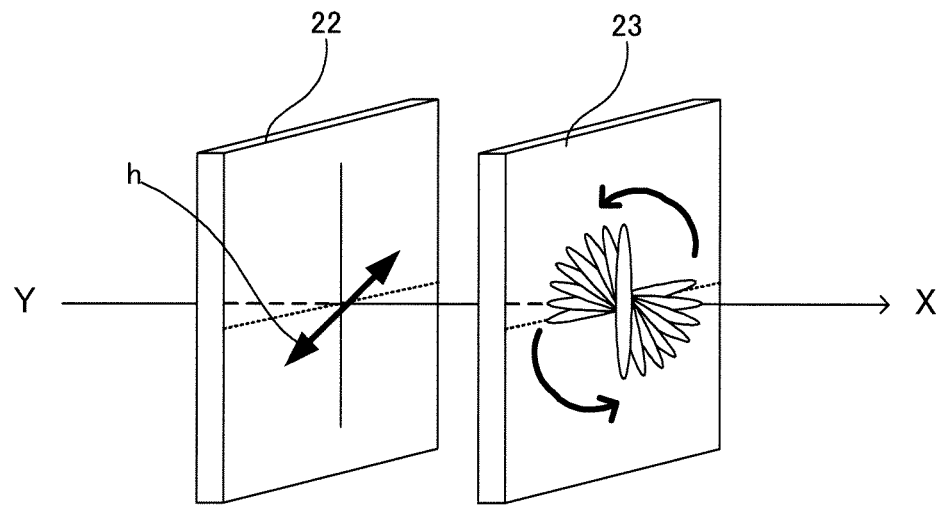

These aspects will be described with reference to the drawings. FIG. 4 is a schematic diagram showing another example of the liquid crystal display device of this embodiment. As illustrated in FIG. 4, in the liquid crystal display device of this embodiment, when the direction "h" of the polarization transmission axis of the polarizer 22 is inclined to the left side with respect to the vertical direction as viewed from the display side, the rotation direction of the cholesteric structure in the optical rotation plate 23 is preferably the rightward rotation (FIG. 4A). On the other hand, when the direction "h" of the polarization transmission axis of the polarizer 22 is inclined to the right side with respect to the vertical direction as viewed from the display side, the rotation direction of the cholesteric structure in the optical rotation plate 23 is preferably the leftward rotation (FIG. 4B).

2. Liquid Crystal Cell

Then, the liquid crystal cell used in this embodiment will be described. As the liquid crystal cell used in this embodiment, those known as a liquid crystal cell generally used for a liquid crystal display device can be used. As the liquid crystal cell for a liquid crystal display device, those of various systems such as IPS, VA, OCB, ECB, STN and TN are known according to the aspect of the liquid crystal molecule arrangement in the cell. In this embodiment, a liquid crystal cell of any system can be used preferably.

3. Polarizer

As the polarizer used in this embodiment, those generally known as a polarizer used for a liquid crystal display device can be used, and thus detailed description is omitted here.

A general liquid crystal display device comprises a liquid crystal cell and a polarizing plate disposed on both sides of the liquid crystal cell. Furthermore, the polarizing plate comprises in general a polarizer and a polarizing plate protection film disposed on both sides of the polarizer. The polarizer used in this embodiment does not denote the above-mentioned polarizing plate but a polarizer excluding the polarizing plate protection film from the polarizing plate.

4. Liquid Crystal Display Device

As mentioned above, the liquid crystal display device of this embodiment has at least a liquid crystal cell, a polarizer, and an optical rotation plate. The aspect of disposing these configurations in the liquid crystal display device of this embodiment is not particularly limited as long as it is an aspect of disposing the optical rotation plate on the display side with respect to the above-mentioned polarizer, and thus an optional configuration can be employed according to the production method of the liquid crystal display device, and the like.

Here, as mentioned above, the polarizing plate commonly used for the liquid crystal display device has a polarizer and a polarizing plate production film disposed on both sides of the polarizer. The polarizer used in this embodiment may be used as such a polarizing plate, or it may be used as a polarizer itself. However, in consideration to the stability over time of the polarizing performance, it is preferable to use the same as a polarizing plate. Then, in the case of using the polarizer as the polarizing plate, the above-mentioned optical rotation plate may be used as an element independent of the polarizing plate, or it may be formed integrally with the polarizing plate. The aspect of using the optical rotation plate in this embodiment may be any of these embodiments. In particular, it is preferable to form the same integrally with the polarizing plate. Since the optical rotation plate is used according to such an aspect, the configuration of the liquid crystal display device of this embodiment can be simplified so that the liquid crystal display device of this embodiment may have further higher production efficiency.

As an aspect of forming integrally the polarizing plate and the optical rotation plate in the liquid crystal display device of this embodiment, an aspect of a polarizing plate, in which, a polarizer, a first polarizing plate protection film disposed on the display side of the above-mentioned polarizer, and a second polarizing plate protection film disposed on the liquid crystal cell side of the polarizer are used, and the above-mentioned optical rotation plate is used as the above-mentioned first polarizing plate protection film can be presented. Since the optical rotation plate is used by such an aspect, the functions required to the surface film, such as the AG (antiglare), LR (low reflection), antifouling properties, and antistatic properties can be provided.

Figure 5:
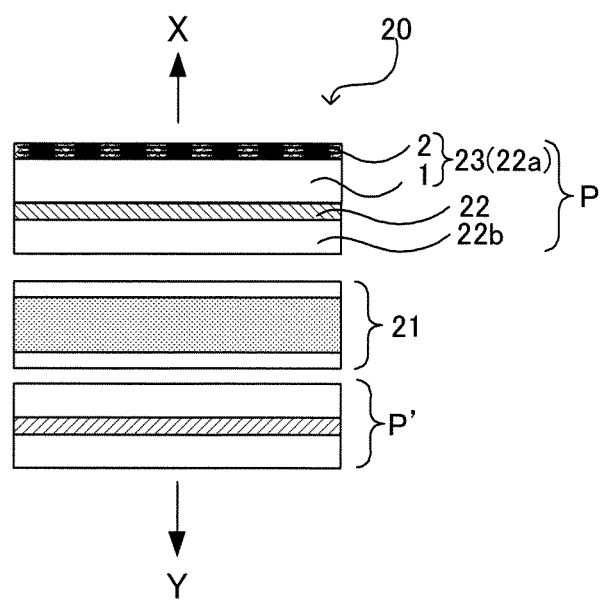
FIG. 5 is a schematic cross-sectional view showing another example of a liquid crystal display device of the present invention.

These will be described with reference to the drawings. FIG. 5 is a schematic cross-sectional view illustrating the case of integrally forming the optical rotation plate and the polarizing plate in the liquid crystal display device of this embodiment. As illustrated in FIG. 5, the liquid crystal display device 20 of this embodiment comprises a liquid crystal cell 21, and a polarizing plate P disposed on the display side of the liquid crystal cell 21. The polarizing plate P comprises a polarizer 22, a first polarizing plate protection film 22a disposed on the display side of the polarizer 22, and a second polarizing plate protection film 22b disposed on the liquid crystal cell 21 side of the polarizer 22 so that the optical rotation plate 23 may be used as the above-mentioned first polarizing plate protection film 22a.

For the liquid crystal device of this embodiment comprising at least the above-mentioned liquid crystal cell, polarizer and optical rotation plate, as needed, other optional configurations may be used. The optional configurations used for this embodiment may be suitably determined according to factors such as the application and the display system of the liquid crystal display device of this embodiment, and thus it is not particularly limited. As such an optional configuration, for example, a polarizer or a polarizing plate disposed on the backlight side of the above-mentioned liquid crystal cell, a retardation film (view angle compensating film) disposed on the backlight side of the above-mentioned polarizer, and the like can be presented.

Moreover, the liquid crystal display device of this embodiment may be a transmission type liquid crystal display device, a reflection type liquid crystal display device, or furthermore, a semi transmission type liquid crystal display device.

II. Second Embodiment

Then, the second embodiment of the liquid crystal display device of the present invention will be described.

The liquid crystal display device of the second embodiment comprises a liquid crystal cell, a polarizer disposed on the display side of the above-mentioned liquid crystal cell, and an optical conversion layer disposed on the display side with respect to the above-mentioned polarizer and having a function of converting linear polarization transmitted the above-mentioned polarizer to elliptical polarization.

Figure 11:
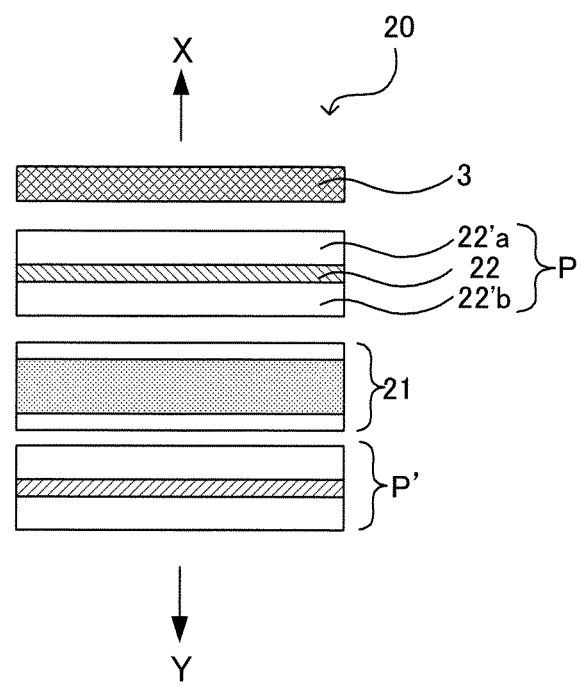
FIG. 11 is a schematic cross-sectional view showing another example of a liquid crystal display device of the present invention.

Such a liquid crystal display device of this embodiment will be described with reference to the drawings. FIG. 11 is a schematic cross-sectional view showing an example of the liquid crystal display device of this embodiment. As illustrated in FIG. 11, the liquid crystal display device 20 of this embodiment comprises a liquid crystal cell 21, a polarizer 22 disposed on the display side of the above-mentioned liquid crystal cell, and an optical conversion layer 3 further on the display side of the above-mentioned polarizer.

In such an example of the liquid crystal display device 20 of this embodiment, the above-mentioned optical conversion layer 3 has a function of converting a light transmitted the liquid crystal cell 21 and further transmitted the polarizer 22 so as to be linear polarization into elliptical polarization.

As illustrated in FIG. 11, in the liquid crystal display device 20 of this embodiment, the polarizer 22 may be used as a polarizing plate P having a configuration interposed between polarizing plate protection films 22' on both sides, or a polarizing plate P having a polarizer on the backlight side of the liquid crystal cell 1 may be disposed.

In FIG. 11, the X direction represents the display side and the Y direction the backlight side (the same is applied to the drawings hereafter).

Here, in this embodiment, the "display side" denotes the side of where an observer of the liquid crystal display device observes an image displayed on the screen of the liquid crystal display device.

According to this embodiment, since the above-mentioned optical conversion layer is used so that linear polarization transmitted the above-mentioned polarizer may be elliptical polarization, an image visually recognized in a specific direction corresponding to the longer axis direction of the elliptical polarization can be provided brighter than in the other directions. Therefore, according to this embodiment, for example by aligning the longer axis of the elliptical polarization with the vertical direction, a liquid crystal display device enabling bright visual observation in an ordinary state with the polarization glasses put on can be obtained.

From these aspects, according to this embodiment, a liquid crystal display device enabling bright visual observation even in a state with the polarizing glassed put on can be obtained.

The liquid crystal display device of this embodiment comprises at least a liquid crystal cell, a polarizer and an optical conversion layer. As needed, it may have another optical configuration.

Hereafter, each configuration used in this embodiment will be described successively.

1. Optical Conversion Layer

First, the optical conversion layer used in this embodiment will be described. The optical conversion layer used in this embodiment is disposed on the display side of the polarizer to be described later and has a function of converting linear polarization transmitted the above-mentioned polarizer into elliptical polarization. According to the liquid crystal display device of this embodiment, the optical conversion layer has a function of converting a light transmitted the above-mentioned polarizer into elliptical polarization, not circular polarization.

Hereafter, such an optical conversion layer used for this embodiment will be described in detail.

(1) Optical Conversion Function

As mentioned above, the optical conversion layer used in this embodiment has a function of converting linear polarization transmitted the polarizer to be described later into elliptical polarization (hereafter, it may be referred to simply as an "optical conversion function"). The optical conversion function of the optical conversion layer of this embodiment is not particularly limited as long as it can convert linear polarization into elliptical polarization.

Figure 12A:
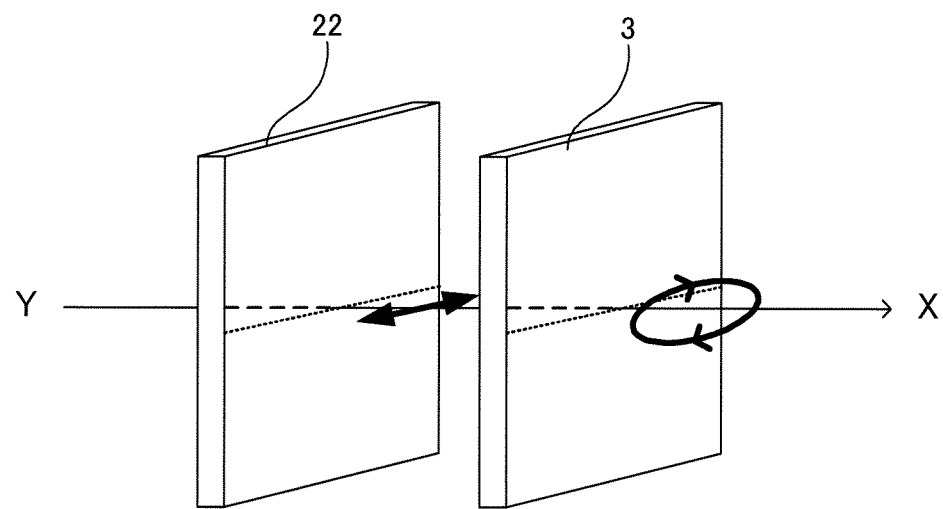
FIGS. 12A and 12B are each a schematic diagram for describing an optical conversion function of the optical conversion layer used in the present invention.
Figure 12B:
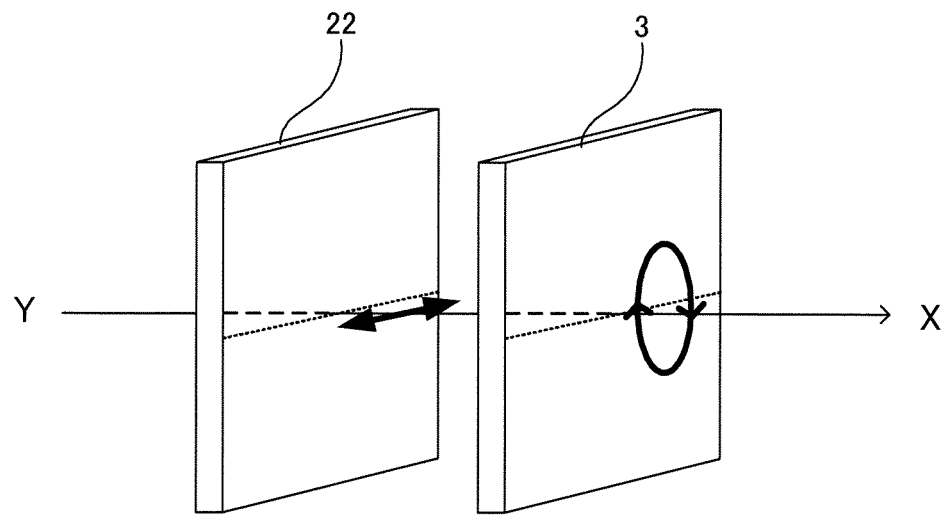

As the optical conversion function of the optical conversion layer in this embodiment, an aspect with the longer axis direction of the elliptical polarization after the conversion in the same direction as the polarization transmission axis of the linear polarization before the conversion, and an aspect with the longer axis direction of the elliptical polarization after the conversion in a direction different from that of the polarization transmission axis of the linear polarization before the conversion can be presented. FIG. 12 is a schematic diagram for describing an embodiment of such an optical conversion function. As shown in FIG. 12, an aspect with the longer axis direction of the elliptical polarization after the conversion in the same direction as the polarization transmission axis of the linear polarization before the conversion (FIG. 12A), and an aspect with the longer axis direction of the elliptical polarization after the conversion in a direction different from that of the polarization transmission axis of the linear polarization before the conversion (FIG. 12B) can be presented.

As the optical conversion layer used in this embodiment, anyone of the above-mentioned aspect can be used preferably. In particular, one having an optical conversion function with the longer axis direction of the elliptical polarization after the conversion of a direction different from that of the polarization transmission axis of the linear polarization before the conversion is preferable for the following reason.

That is, in the case of observing the liquid crystal display device in a state with polarizing glasses put on, only linear polarization having the vibration plane in the direction parallel with the polarization transmission axis of the polarizing glasses is observed. Here, since the polarizing glasses in general transmit only a light having the vibration plane in the vertical direction, if the polarization transmission axis of the polarizer disposed on the display side of the liquid crystal display device is in the horizontal direction, an image cannot be observed in a state with the polarizing glasses put on. Moreover, if the polarization transmission axis of the polarizer is in a direction inclined with respect to the vertical direction, an image observed in a state with the polarizing glasses put on may be dark.

In the case the optical conversion layer having an optical conversion function has the longer axis direction of the elliptical polarization after the conversion in a direction different from that of the polarization transmission axis of the linear polarization before the conversion, the angle formed by the longer axis direction of the elliptical polarization after the conversion and the polarization transmission axis of the linear polarization before the conversion may be suitably determined according to the direction of the polarization transmission axis of the polarizer to be described later, and the like, and thus it is not particularly limited.

Moreover, the direction of the longer axis of the elliptical polarization after the conversion by the optical conversion layer is preferably in the substantially vertical direction. Since the polarization lenses used for the polarizing glasses are disposed with the polarization transmission axis oriented in the vertical direction on the whole, if the longer axis direction of the elliptical polarization after the conversion by the optical conversion layer is substantially in the vertical direction, the liquid crystal display device of this embodiment enables brighter observation even in a state with the polarizing glasses put on. This point will be described with reference to the drawings. FIG. 3 is a schematic diagram for describing the reason why the longer axis direction of the elliptical polarization after the conversion by the optical conversion layer is preferably in the substantially vertical direction. As illustrated in FIG. 3, the polarization lenses used for the polarizing glasses G are disposed with the polarization transmission axis provided in the substantially vertical direction ("g" direction in the figure) in a state with the polarizing glasses put on. Therefore, since the longer axis direction of the elliptical polarization after the conversion with the optical conversion layer 3 ("h" direction in the figure) is substantially in the vertical direction, the liquid crystal display device of this embodiment can be observed further brightly even in a state with the polarizing glasses put on. In FIG. 3, the member described as the polarizing plate 23 in the first embodiment is an optical conversion layer in this embodiment.

Moreover, the optical conversion layer in this embodiment is preferably one capable of converting linear polarization into elliptical polarization with the ellipticity in a range of 0.006 to 0.8. Since the ellipticity after the conversion by the optical conversion layer is in a range of 0.006 to 0.8, a liquid crystal display device enabling bright visual recognition even in a state with the polarizing glasses put on can be obtained.

(2) Configuration of the Optical Conversion Layer

The configuration of the optical conversion layer used in this embodiment is not particularly limited as long as it can perform the optical conversion function as mentioned above. Therefore, as the optical conversion layer used in this embodiment, any one showing a birefringence capable of converting linear polarization into elliptical polarization can be used. As such an optical conversion layer, for example, those containing a compound having a refractive index anisotropy by a predetermined embodiment can be presented.

As the above-mentioned compound having a birefringence anisotropy, for example, a rod-shaped compound, a nematic liquid crystal compound, a discotic liquid crystal compound, and a polymer material having a refractive index anisotropy can be presented. Therefore, as the above-mentioned optical conversion layer, those containing a compound having a refractive index anisotropy such as a rod-shaped compound, a nematic liquid crystal compound, and a discotic liquid crystal compound in a state arranged in a predetermined aspect, or those made of a polymer material having a refractive index anisotropy can be used.

In particular, in this embodiment, as the above-mentioned optical conversion layer, it is preferable to use one containing a rod-shaped compound having a refractive index anisotropy in a state of forming a cholesteric alignment. At the time of disposing in combination with the above-mentioned polarizer, such an optical conversion layer does not require control of the mutual arrangement direction so as to enable arrangement in an optional direction. Therefore, by use of such an optical conversion layer, the liquid crystal display device of this embodiment can be produced by a simple process.

The rod-shaped compound used in this embodiment is not particularly limited as long as it has the refractive index anisotropy and it is capable of providing a desired optical conversion function by arranging in the above-mentioned optical conversion layer. In particular, as the rod-shaped compound used in this embodiment, those having a polymerizable functional group in a molecule can be used preferably, and furthermore, those having a three-dimensionally cross-linkable polymerizable functional group can be used more preferably. Since the above-mentioned rod-shaped compound has a polymerizable functional group, the above-mentioned rod-shaped compound can be fixed by polymerization so that the optical conversion layer used in this embodiment hardly has the change of the optical conversion function generated over time.

Moreover, in the present invention, the above-mentioned rod-shaped compound having a polymerizable functional group and the above-mentioned rod-shaped compound without a polymerizable functional group may be used as a mixture.

The "three-dimensional cross-linking" mentioned above denotes three-dimensional polymerization of a liquid crystalline molecule with each other so as to have a state with a mesh (network) structure.

Since the above-mentioned polymerizable functional group is same as that described in the above-mentioned item of "A. Optical rotation plate", description is omitted here.

Moreover, since the rod-shaped compound and the chiral agent in this embodiment are same as those described in the above-mentioned item of "A. Optical rotation plate", description is omitted here.

In the case of using one containing a rod-shaped compound forming a cholesteric arrangement as the above-mentioned optical conversion layer, the optical conversion layer used in this embodiment will be one having a selective reflection wavelength derived from the cholesteric arrangement. It is theoretically known that those having a selective reflection wavelength have a twist angle of 360° or more. Although the range of the selective reflection wavelength in this embodiment is not particularly limited, since it is outside the visible light region, contrast decline derived from coloring by the external light or reflection of the display light can be prevented.

Moreover, in the case material containing a rod-shaped compound for forming a cholesteric arrangement is used as the above-mentioned optical conversion layer, the rotating direction of the cholesteric arrangement is not particularly limited. In particular, in this embodiment, in the case the polarization transmission axis of the polarizer used in this embodiment is inclined to the left side with respect to the vertical direction as viewed from the display side, the rotating direction of the above-mentioned cholesteric structure is preferably the rightward rotation. On the other hand, in the case the polarization transmission axis of the above-mentioned polarizer is inclined to the right side with respect to the vertical direction as viewed from the display side, the rotating direction of the above-mentioned cholesteric structure is preferably the leftward rotation.

These aspects will be described with reference to the drawings. FIG. 4 is a schematic diagram showing another example of the liquid crystal display device of this embodiment. As illustrated in FIG. 4, in the liquid crystal display device of this embodiment, when the direction "h" of the polarization transmission axis of the polarizer 2 is inclined to the left side with respect to the vertical direction as viewed from the display side, the rotation direction of the cholesteric structure in the optical conversion layer 3 is preferably the rightward rotation (FIG. 4A). On the other hand, when the direction "h" of the polarization transmission axis of the polarizer 2 is inclined to the right side with respect to the vertical direction as viewed from the display side, the rotation direction of the cholesteric structure in the optical functional layer 3 is preferably the leftward rotation (FIG. 4B). In FIG. 4, the member described as the polarizing plate 23 in the first embodiment is an optical conversion layer in this embodiment.

The axis of the linear polarization transmitting the cholesteric structure is rotated according to the rotary polarization associated with the cholesteric structure and the rotation angle is made larger according to increase in the thickness of the cholesteric structure. Since the rotating direction of the optical rotation plate of this embodiment is determined according to the inclination of the polarization transmission axis of the polarizer as mentioned above, the rotation angle of the elliptical polarization transmission axis to coincide with the polarization transmission axis of the vertical direction of the sunglasses can be made smaller. Therefore, the thickness of the optical conversion layer with a cholesteric structure formed can be made smaller further so that the thickness of the entire liquid crystal display device can be made smaller further particularly for the application requiring the thinness. Furthermore, productivity increases by simplification of the production process and cost reduction can be enabled by cutting back the use amount of the cholesteric liquid crystal material, which is a relatively expensive material.

The thickness of the above-mentioned optical conversion layer is not particularly limited as long as it is in a range capable of providing a desired birefringence according to the kind of the contained compound having a refractive index anisotropy, and the like. In particular, in this embodiment, the thickness of the above-mentioned optical conversion layer is preferably in a range of 0.1 μm to 100 μm, it is more preferably in a range of 0.5 μm to 20 μm, and it is further preferably in a range of 1 μm to 10 μm.

The above-mentioned optical conversion layer may consist of the above-mentioned optical conversion layer alone, or the above-mentioned optical conversion layer may have a configuration formed on an optional substrate.

As it will be described later, in the case the above-mentioned optical conversion layer is formed integrally with the optical polarizing plate, in general, one consists of the above-mentioned optical conversion layer alone is used.

In the case the above-mentioned optical conversion layer formed on an optional substrate is used, the substrate used in this embodiment is not particularly limited as long as it does not inhibit the birefringence properties of the above-mentioned optical conversion layer and it is transparent. In particular, the transparent substrate used in this embodiment preferably has a transmittance in the visible light region of 80% or more, and it further preferably has that of 90% or more. Here, the transmittance of the base material can be measured by the JIS K7361-1 (testing method for the total light transmittance of a plastic-transparent material).

As the base material used in this embodiment, as long as the above-mentioned transparency is provided, either a flexible material having flexibility or a rigid material without flexibility can be used. In particular, in this embodiment, it is preferable to use a flexible material.

Examples of the above-mentioned flexible material include base materials made of a cellulose derivative, a cycloolefin polymer, an acrylic resin such as polymethyl methacrylate, polyethylene terephthalate, polypropylene terephthalate, polybutylene terephthalate, polyethylene naphthalate, polypropylene naphthalate, polyester such as polyallylate, polyvinyl alcohol, polyimide, polysulfone, polyether sulfone, amorphous polyolefin, a modified acrylic polymer, polystyrene, an epoxy resin, or polycarbonate. In particular, in this embodiment, it is preferable to use a base material made of cellulose derivative or a cycloolefin polymer.

As the above-mentioned cellulose derivative used in this embodiment, it is preferable to use a cellulose ester. Furthermore, among the cellulose esters, it is preferable to use cellulose acylates. Since the cellulose acylates are widely used industrially, it is advantageous in terms of the accessibility convenience.

As the above-mentioned cellulose acylates, it is preferable to use a lower fatty acid ester having 2 to 4 carbon atoms. Such a lower fatty acid ester may include only a single lower fatty acid ester such as cellulose acetate or it may include a plurality of fatty acid esters such as cellulose acetate butylate and cellulose acetate propionate.

In this embodiment, among the above-mentioned lower fatty acid esters, cellulose acetate can be used particularly preferably. Moreover, among the cellulose acetates, it is most preferable to use triacetyl cellulose having 57.5 to 62.5% average acetylation degree (substitution degree: 2.6 to 3.0). Here, the acetylation degree denotes the bonded acetic acid amount per cellulose unit mass. The acetylation degree can be obtained by measurement and calculation of the acetylation by the ASTM: D-817-91 (testing method for cellulose acetate, and the like). The acetylation degree of the triacetyl cellulose constituting a triacetyl cellulose film can be obtained by the above-mentioned method after removing the impurities included in the film such as a plasticizer.

On the other hand, the cycloolefin polymer used in this embodiment is not particularly limited as long as it is a resin having a unit of a monomer including cyclic olefin (cycloolefin). As such a monomer including a cyclic olefin mentioned above, for example, norbornene and a polycyclic norbornene monomer can be presented.

As the cycloolefin polymer used in this embodiment, either cycloolefin polymer (COP) or cycloolefin copolymer (COC) can be used preferably.

The cycloolefin polymer used in this embodiment may be a single polymer including a monomer of the above-mentioned cyclic olefin or a copolymer.

Specific examples of the base material including a cycloolefin polymer used in this embodiment include Topas® manufactured by Ticona Corp., Arton® manufactured by JSR Corporation, ZEONOR® manufactured by Nippon Zeon Corporation, ZEONEX® manufactured by Nippon Zeon Corporation, Apel® manufactured by Mitsui Chemical Inc., and those produced by applying a drawing process to these base materials.

2. Liquid Crystal Cell

Since the liquid crystal cell used in this embodiment is same as that used in the above-mentioned first embodiment, description is omitted here.

3. Polarizer

Since the polarizer used in this embodiment is also same as that used in the above-mentioned first embodiment, description is omitted here.

4. Liquid Crystal Display Device

As mentioned above, the liquid crystal display device of this embodiment uses at least a liquid crystal cell, a polarizer, and an optical conversion layer. The aspect of disposing these configurations in the liquid crystal display device of this embodiment is not particularly limited as long as it is an aspect of disposing the optical conversion layer on the display side with respect to the above-mentioned polarizer, and thus an optional configuration can be employed according to the production method of the liquid crystal display device, and the like.

Here, as mentioned above, the polarizing plate commonly used for the liquid crystal display device includes a polarizer and a polarizing plate production film disposed on both sides of the polarizer. The polarizer used in this embodiment may be used as such a polarizing plate, or it may be used as a polarizer itself. However, in consideration to the stability over time of the polarizing performance, it is preferable to use the same as a polarizing plate. Then, in the case of using the polarizer as the polarizing plate, the above-mentioned optical conversion layer may be used as an element independent of the polarizing plate, or it may be formed integrally with the polarizing plate. The aspect of using the optical conversion layer in this embodiment may be any of these aspects. In particular, it is preferable to form the same integrally with the polarizing plate. Since the optical conversion layer is used according to such an aspect, the configuration of the liquid crystal display device of this embodiment can be simplified so that the liquid crystal display device of this embodiment may have higher production efficiency.

As an aspect of forming integrally the polarizing plate and the optical conversion layer in the liquid crystal display device of this aspect, following aspects of a polarizing plate comprising a polarizer, a first polarizing plate protection film disposed on the display side of the above-mentioned polarizer, and a second polarizing plate protection film disposed on the liquid crystal cell side of the polarizer can be presented, wherein the optical conversion layer is formed on the display side surface of the above-mentioned first polarization plate protection film, and wherein the optical conversion layer is formed between the polarizer and the first polarizing plate protection film.

Figure 13A:
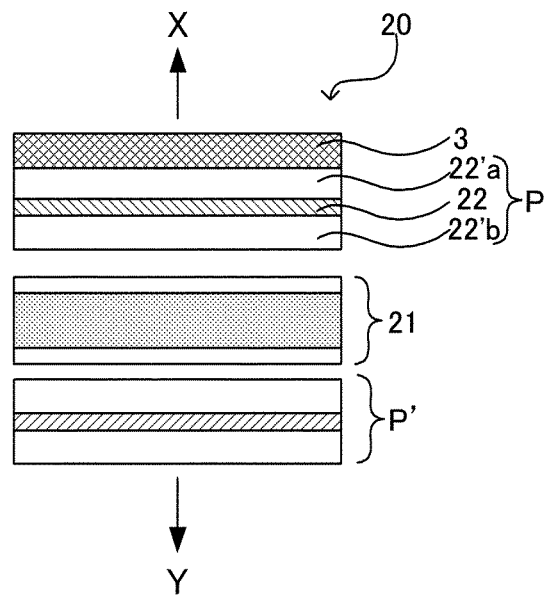
FIGS. 13A and 13B are each a schematic cross-sectional view showing another example of a liquid crystal display device of the present invention.
Figure 13B:
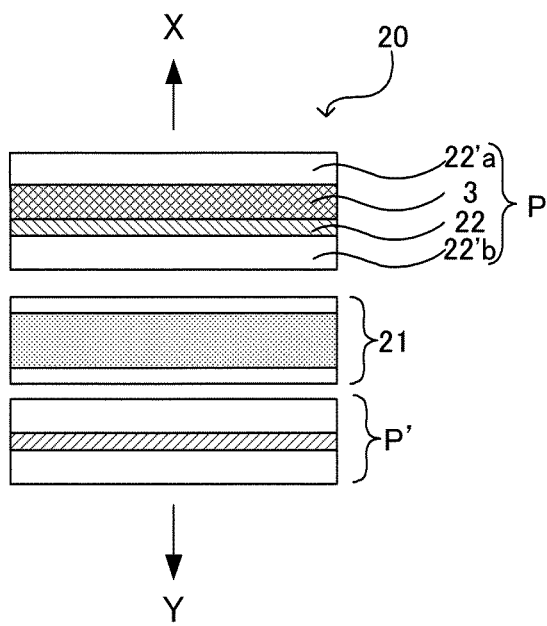
Figure 14:
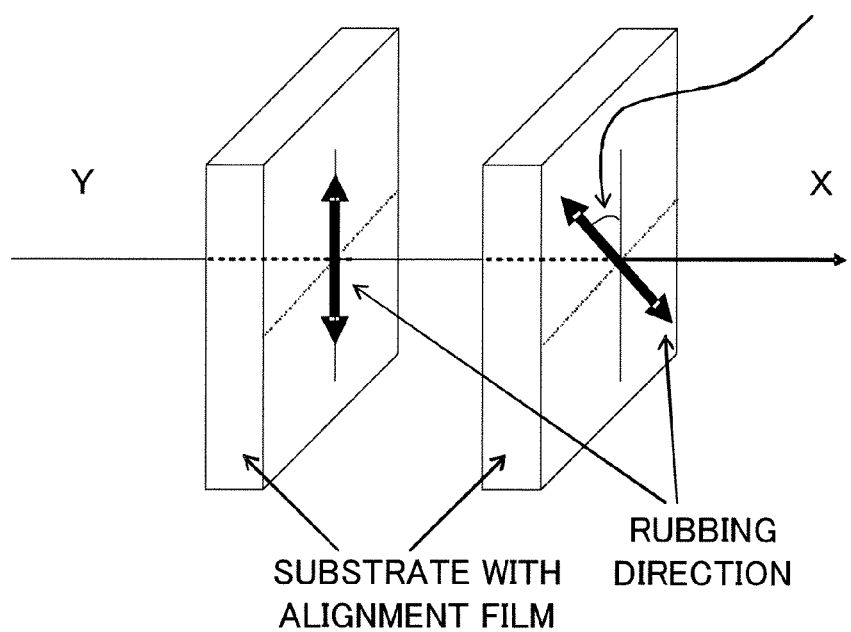
FIG. 14 is a schematic diagram for describing the angle formed by the rubbing directions of a substrate with a Y side alignment film and a substrate with a X side alignment film.
Figure 15A:
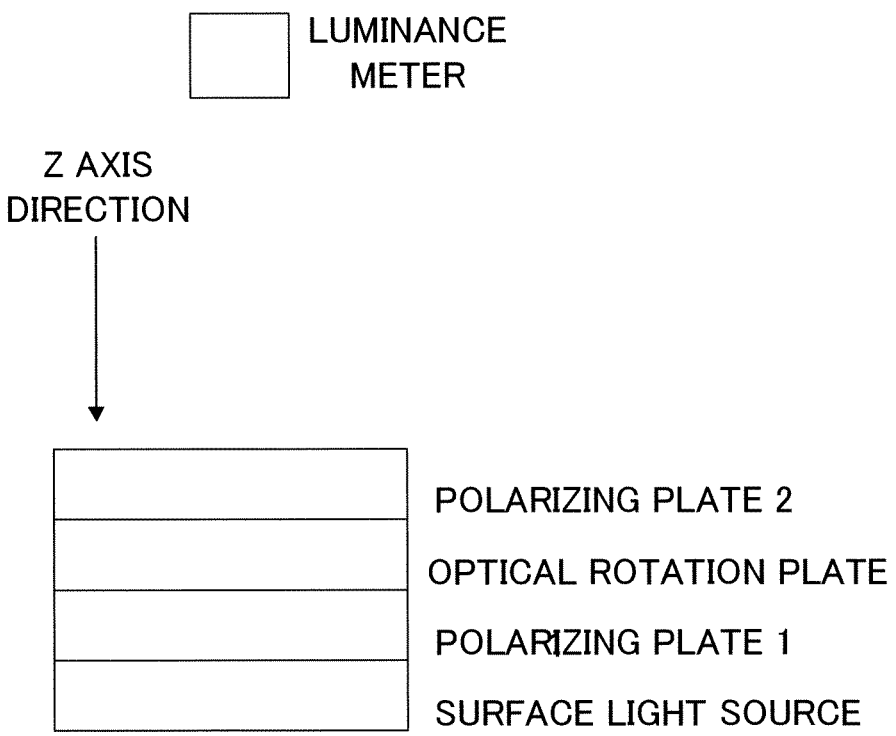
FIGS. 15A and 15B are schematic diagrams for describing the evaluation method of the rotation angle.
Figure 15B:
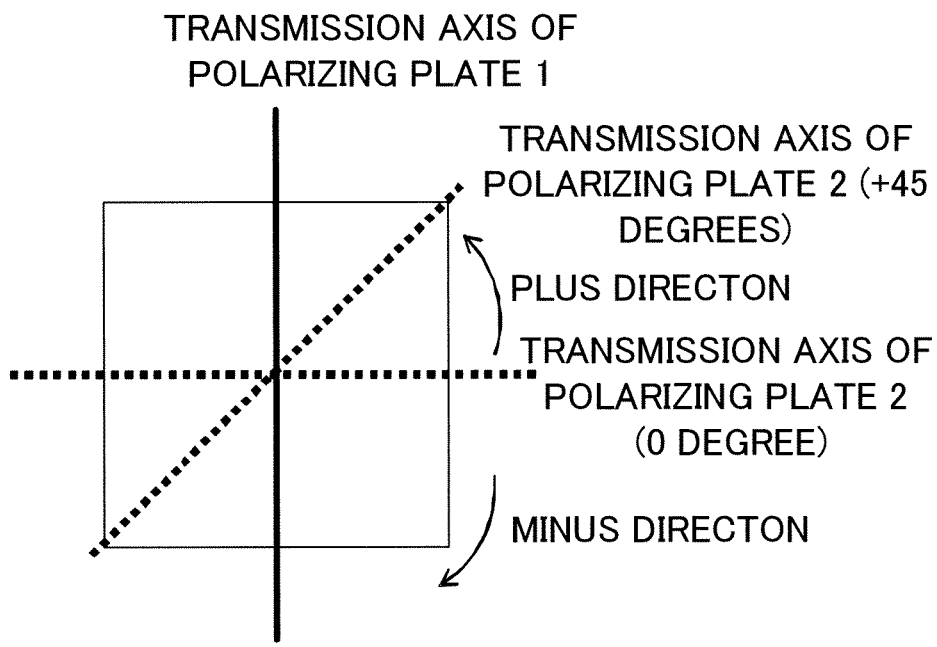

These aspects will be described with reference to the drawings. FIG. 13 is a schematic cross-sectional view illustrating the case of integrally forming the optical conversion layer and the polarizing plate in the liquid crystal display device of this embodiment. As illustrated in FIG. 13, the liquid crystal display device 20 of this embodiment includes a liquid crystal cell 21, and a polarizing plate P disposed on the display side of the liquid crystal cell 21. The polarizing plate P comprises a polarizer 22, a first polarizing plate protection film 22'a disposed on the display side of the polarizer 22, and a second polarizing plate protection film 22'b disposed on the liquid crystal cell side of the polarizer so that the optical conversion layer 3 may be formed on the display side surface of the above-mentioned first polarizing plate protection film (FIG. 13A). Moreover, the optical conversion layer 3 may be formed between the polarizer 22 and the first polarizing plate protection film 22'a (FIG. 13B).

In this embodiment, any of the above-mentioned two aspects can be used preferably. In particular, the above-mentioned embodiment illustrated in FIG. 13A is preferable. Thereby, the functions required to the surface film, such as the AG (antiglare), LR (low reflection), antifouling properties, and antistatic property can be provided.

For the liquid crystal device of this embodiment comprising at least the above-mentioned liquid crystal cell, polarizer, and optical conversion layer, as needed, other optional configurations may be used. The optional configurations used for this embodiment may be suitably determined according to factors such as the application and the display system of the liquid crystal display device of this embodiment, and thus it is not particularly limited. As such an optional configuration, for example, a polarizer or a polarizing plate disposed on the backlight side of the above-mentioned liquid crystal cell, a retardation film (view angle compensating film) disposed on the backlight side of the above-mentioned polarizer, and the like can be presented.

Moreover, the liquid crystal display device of this embodiment may be a transmission type liquid crystal display device, a reflection type liquid crystal display device, or furthermore, a semi transmission type liquid crystal display device.

The present invention is not limited to the above-mentioned embodiments. The embodiments mentioned above are merely examples so that any one having substantially the same configuration as the technological idea mentioned in the scope of the claims of the present invention with the same effects is incorporated in the technological scope of the present invention.

EXAMPLES

Production of the Substrate

A glass substrate with an alignment film was produced by coating on a 0.7 mm thickness transparent glass substrate polyimide dissolved in a solvent by a spin coating process, drying, heating at 200° C. for forming a film (film thickness 0.1 µm), and rubbing in a certain direction for forming an alignment film.

Example 1

A cyclohexanone solution (solid component 40 parts by weight) was prepared by dissolving 95.3 parts by weight of a liquid crystalline monomer molecule having polymerizable acrylate at both ends and a spacer between mesogen at the center part and the above-mentioned acrylate (Paliocolor (registered trademark) LC1057 (manufactured by BASF Corp.)), 4.7 parts by weight of a chiral agent molecule having polymerizable acrylate at the end of both sides (Paliocolor (registered trademark) LC756 (manufactured by BASF Corp.)), and 2.5 parts by weight of a photo polymerization initiating agent with respect to the above-mentioned liquid crystalline monomer.

By applying the above-mentioned cyclohexanone solution onto the glass substrate with an alignment film with a spin coater, evaporating the cyclohexanone in the above-mentioned cyclohexanone solution at 80° C., and maintaining the temperature at 100° C. for 2 minutes, the liquid crystalline monomer molecule was aligned. Then, by directing an ultraviolet ray to the above-mentioned coating film by 300 mJ/cm$^2$, and three dimensionally cross-linking the acrylate of the liquid crystalline monomer molecule aligned by the radical generated from the photo polymerization initiating agent in the coating film into a polymer so as to fix a cholesteric structure on the alignment film, an optical rotation plate was obtained. At the time, the film thickness of the cholesteric layer was 5.4 µm. Moreover, the selective reflection center wavelength measured with a spectrophotometer UV-3100PC® (produced by Shimadzu Corporation) was 780 nm.

Example 2

An optical rotation plate was produced in the same manner as in the example 1 except that the film thickness was 3.3 µm.

Example 3

An optical rotation plate was produced in the same manner as in the example 1 except that 98.0 parts by weight of a liquid crystalline monomer molecule (Paliocolor (registered trademark) LC1057 (manufactured by BASF Corp.) and 2.0 parts by weight of a chiral agent molecule (Paliocolor (registered trademark)) LC756 (manufactured by BASF Corp.)) were used. At the time, the film thickness of the cholesteric layer was 5.2 µm. Moreover, the selective reflection center wavelength measured with a spectrophotometer UV-3100PC® (produced by Shimadzu Corporation) was 1,580 nm.

Example 4

An optical rotation plate was produced in the same manner as in the example 3 except that the film thickness was 4.0 µM.

Example 5

An optical rotation plate was produced in the same manner as in the example 3 except that the film thickness was 2.6 µm.

Example 6

An optical rotation plate was produced in the same manner as in the example 1 except that 97.4 parts by weight of a liquid crystalline monomer molecule (Paliocolor (registered trademark) LC242 (manufactured by BASF Corp.) and 2.6 parts by weight of a chiral agent molecule (Paliocolor (registered trademark)) LC756 (manufactured by BASF Corp.)) were used. At the time, the film thickness of the cholesteric layer was 4.2 µm. Moreover, the selective reflection center wavelength measured with a spectrophotometer UV-3100PC® (produced by Shimadzu Corporation) was 820 nm.

Example 7

An optical rotation plate was produced in the same manner as in the example 6 except that the film thickness was 1.9 µm.

Example 8

An optical rotation plate was produced in the same manner as in the example 1 except that 97.7 parts by weight of a liquid crystalline monomer molecule (Paliocolor (registered trademark) LC242 (manufactured by BASF Corp.) and 2.3 parts by weight of a chiral agent molecule (Paliocolor (registered trademark)) LC756 (manufactured by BASF Corp.)) were used. At the time, the film thickness of the cholesteric layer was 4.0 µm. Moreover, the selective reflection center wavelength measured with a spectrophotometer UV-3100PC® (produced by Shimadzu Corporation) was 1,040 nm.

Example 9

An optical rotation plate was produced in the same manner as in the example 8 except that the film thickness was 2.2 µm.

Example 10

An optical rotation plate was produced in the same manner as in the example 1 except that 98.0 parts by weight of a liquid crystalline monomer molecule (Paliocolor (registered trademark) LC242 (manufactured by BASF Corp.) and 2.0 parts by weight of a chiral agent molecule (Paliocolor (registered trademark)) LC756 (manufactured by BASF Corp.)) were used. At the time, the film thickness of the cholesteric layer was 3.9 µm. Moreover, the selective reflection center wavelength measured with a spectrophotometer UV-3100PC® (produced by Shimadzu Corporation) was 1,220 nm.

Example 11

An optical rotation plate was produced in the same manner as in the example 10 except that the film thickness was 2.0 µm.

Example 12

An optical rotation plate was produced in the same manner as in the example 1 except that 99.1 parts by weight of a liquid crystalline monomer molecule (Paliocolor (registered trademark) LC242 (manufactured by BASF Corp.) and 0.9 part by weight of a chiral agent molecule (Paliocolor (registered trademark)) LC756 (manufactured by BASF Corp.)) were used. At the time, the film thickness of the cholesteric layer was 4.0 µm. Moreover, the selective reflection center wavelength measured with a spectrophotometer UV-3100PC® (produced by Shimadzu Corporation) was 2,310 nm.

Comparative Example 1

As shown in FIG. 11, the substrates with an alignment film were bonded with an epoxy adhesive with the alignment film surfaces facing with each other and having a 5 µm spacer in between with a 5 µm cell gap so as to have the angle formed by the rubbing directions of 90 degrees and the same twist direction as the rightward cholesteric liquid crystal. An optical rotation plate was produced by injecting a nematic liquid crystal 5CB between the spacer by a capillary tube phenomenon, applying a heat treatment at 50° C., wherein the liquid crystal is in the isotropic phase for 30 minutes, and then cooling down the same to the room temperature (about 20 degrees).

Comparative Example 2

An optical rotation plate was produced in the same manner as in the comparative example 1 except that the angle formed by the rubbing directions was 30 degrees and the cell gap was 10 µm.

Comparative Example 3

An optical rotation plate was produced in the same manner as in the comparative example 1 except that the angle formed by the rubbing directions was 60 degrees and the cell gap was 20 µm.

Comparative Example 4

An optical rotation plate was produced in the same manner as in the example 1 except that 90.0 parts by weight of a liquid crystalline monomer molecule (Paliocolor (registered trademark) LC242 (manufactured by BASF Corp.) and 10.0 parts by weight of a chiral agent molecule (Paliocolor (registered trademark)) LC756 (manufactured by BASF Corp.)) were used. At the time, the film thickness of the cholesteric layer was 4.0 µm. Moreover, the selective reflection center wavelength measured with a spectrophotometer UV-3100PC® (produced by Shimadzu Corporation) was 250 nm.

Comparative Example 5

An optical rotation plate was produced in the same manner as in the example 1 except that 96.0 parts by weight of a liquid crystalline monomer molecule (Paliocolor (registered trademark) LC242 (manufactured by BASF Corp.) and 4.0 parts by weight of a chiral agent molecule (Paliocolor (registered trademark)) LC756 (manufactured by BASF Corp.)) were used. At the time, the film thickness of the cholesteric layer was 4.2 μm. Moreover, the selective reflection center wavelength measured with a spectrophotometer UV-3100PC® (produced by Shimadzu Corporation) was 650 nm.

[Evaluation]

For evaluating the rotation angle of the optical rotation plates produced in the above-mentioned examples and comparative examples, evaluation was carried out by the following method. A schematic diagram of the evaluation method is shown in FIG. 12 (here, FIG. 12B is a diagram at the time of viewing FIG. 12A from the Z axis direction).

(1) The polarizing plate 1 is installed on the surface of light source.
(2) The optical rotation plate is installed on the optical polarizing plate 1.
(3) The polarizing plate 2 is installed on the optical rotation plate so that the transmission axis of the polarizing plate 1 and the transmission axis of the polarizing plate 2 are orthogonal with each other.
(4) A luminance meter (manufactured by TOPCON CORP. BM-5A®) is installed at a position away from the optical rotation plate by 600 mm.
(5) The luminance is measured while rotating the optical rotation plate 2 so that the angle with the minimum luminance is determined as the rotation angle of the optical rotation plate. The polarizing plate transmission axis and the rotation direction are as shown in FIG. 12B.

The evaluation results are shown in Table 1. As it is apparent form the results, according to the present invention, the rotation angle and the twist angle do not coincide with each other. According to the comparative example 5, although the value obtained by dividing the absolute value of the rotation angle by the twist angle is smaller than 1, the coating film is observed red so that it is not suitable for the use for the uppermost surface of the liquid crystal display device.

acrylate (Paliocolor (registered trademark) LC1057 (manufactured by BASF Corp.)), and 2 parts by weight of a chiral agent molecule having polymerizable acrylate at the end of both sides (Paliocolor (registered trademark) LC756 (manufactured by BASF Corp.)). 2.5% by weight of a photo polymerization initiator (IRGACURE 184®) to the liquid crystalline monomer was added to the above-mentioned cyclohexanone solution (solid component 40% by weight).

On the other hand, an alignment film was formed by coating on a 0.7 mm thickness transparent glass substrate polyimide (Optomer AL1254® manufactured by JSR Corporation) dissolved in a solvent by a spin coating process, drying, heating at 200° C. for forming a film (film thickness 0.1 μm), and by rubbing in a certain direction. Then, the glass substrate with an alignment film was set on a spin coater for applying the above-mentioned cyclohexanone solution onto the alignment film.

Then, by evaporating the cyclohexanone in the above-mentioned cyclohexanone solution at 80° C., and maintaining the temperature at 100° C. for 2 minutes, the liquid crystalline monomer molecule was aligned. Then, by directing an ultraviolet ray to the above-mentioned coating film by 500 mJ/cm$^2$, and three dimensionally cross-linking the acrylate of the liquid crystalline monomer molecule aligned by the radical generated from the photo polymerization initiating agent and acrylate of the chiral agent in the coating film into a polymer so as to fix a cholesteric structure on the alignment film, an optical conversion layer was obtained. At the time, the film thickness of the optical conversion layer was 5.2 μm. Moreover, the selective reflection center wavelength measured with a spectrophotometer UV-3100PC® (produced by Shimadzu Corporation) was 1,670 nm.

Example 14

An optical conversion layer was produced in the same manner as in the example 1 except that a cyclohexanone solution prepared by dissolving 99 parts by weight of a liquid crystalline monomer molecule having polymerizable acrylate

TABLE 1

|  | Selective reflection wavelength λ (nm) | Film thickness (μm) | Pitch (nm) | Twist angle (degree) | Rotation angle (degree) | Rotation angle absolute value/twist angle |
| --- | --- | --- | --- | --- | --- | --- |
| Example 1 | 780 | 5.4 | 491 | 3960 | −30 | 0.008 |
| Example 2 | 780 | 3.3 | 491 | 2420 | −17.5 | 0.007 |
| Example 3 | 1580 | 5.2 | 996 | 1879 | −35 | 0.019 |
| Example 4 | 1580 | 4 | 996 | 1446 | −27.5 | 0.019 |
| Example 5 | 1580 | 2.6 | 996 | 940 | −17.5 | 0.019 |
| Example 6 | 820 | 4.2 | 528 | 2864 | −10 | 0.003 |
| Example 7 | 820 | 1.9 | 528 | 1296 | −5 | 0.004 |
| Example 8 | 1040 | 4 | 671 | 2146 | −10 | 0.005 |
| Example 9 | 1040 | 2.2 | 671 | 1180 | −5 | 0.004 |
| Example 10 | 1220 | 3.9 | 788 | 1782 | −10 | 0.006 |
| Example 11 | 1220 | 2 | 788 | 914 | −5 | 0.005 |
| Example 12 | 2310 | 4 | 1494 | 964 | −15 | 0.013 |
| Comparative Example 1 |  | 5 | 20000 | 90 | 90 | 1.000 |
| Comparative Example 2 |  | 10 | 120000 | 30 | 30 | 1.000 |
| Comparative Example 3 |  | 20 | 120000 | 60 | 60 | 1.000 |
| Comparative Example 4 | 250 | 4 | 152 | 9465 | 0 | 0.000 |
| Comparative Example 5 | 650 | 4.2 | 417 | 3626 | −10 | 0.003 |

Example 13

A cyclohexanone solution was prepared by dissolving 98 parts by weight of a liquid crystalline monomer molecule having polymerizable acrylate at both ends and a spacer between mesogen at the center part and the above-mentioned acrylate (Paliocolor (registered trademark) LC1057 (manufactured by BASF Corp.)), and 1 part by weight of a chiral agent molecule having polymerizable acrylate at the end of both sides (Paliocolor (registered trademark) LC756 (manufactured by BASF Corp.)) was used. At the time, the film thickness of the optical conversion layer was 5.4 μm. Moreover, the selective reflection center wavelength measured with the above-mentioned spectrophotometer was 1,940 nm.

Example 15

An optical conversion layer was produced in the same manner as in the example 1 except that a cyclohexanone solution prepared by dissolving 98 parts by weight of a liquid crystalline monomer molecule having polymerizable acrylate at both ends and a spacer between mesogen at the center part and the above-mentioned acrylate (Paliocolor (registered trademark) LC242 (manufactured by BASF Corp.)), and 2 parts by weight of a chiral agent molecule having polymerizable acrylate at the end of both sides (Paliocolor (registered trademark) LC756 (manufactured by BASF Corp.)) were used (however, it differs only in that the liquid crystalline monomer was aligned while maintaining the temperature at 80° C. after evaporating the cyclohexanone at 80° C.). At the time, the film thickness of the optical conversion layer was 4.0 μm. Moreover, the selective reflection center wavelength measured with the above-mentioned spectrophotometer was 1,228 nm.

Comparative Example 6

A λ/4 sheet was obtained by heating and drawing a commercially available polycarbonate film (CALIBRE 300 series manufactured by SUMITOMO DOW LIMITED) by a drawing apparatus so as to have the in-plane retardation of 140 nm.

Reference Example 1

An optical conversion layer was produced in the same manner as in the example 1 except that a cyclohexanone solution prepared by dissolving 95 parts by weight of a liquid crystalline monomer molecule having polymerizable acrylate at both ends and a spacer between mesogen at the center part and the above-mentioned acrylate (Paliocolor (registered trademark) LC242 (manufactured by BASF Corp.)), and 5 parts by weight of a chiral agent molecule having polymerizable acrylate at the end of both sides (Paliocolor (registered trademark) LC756 (manufactured by BASF Corp.)) were used (however, it differs only in that the alignment temperature was 80° C.). At the time, the film thickness of the optical conversion layer was 5.0 μm. Moreover, the selective reflection center wavelength measured with the above-mentioned spectrophotometer was 530 nm.

[Evaluation]

(Luminance Measurement with a Luminance Meter)

Figure 16A:
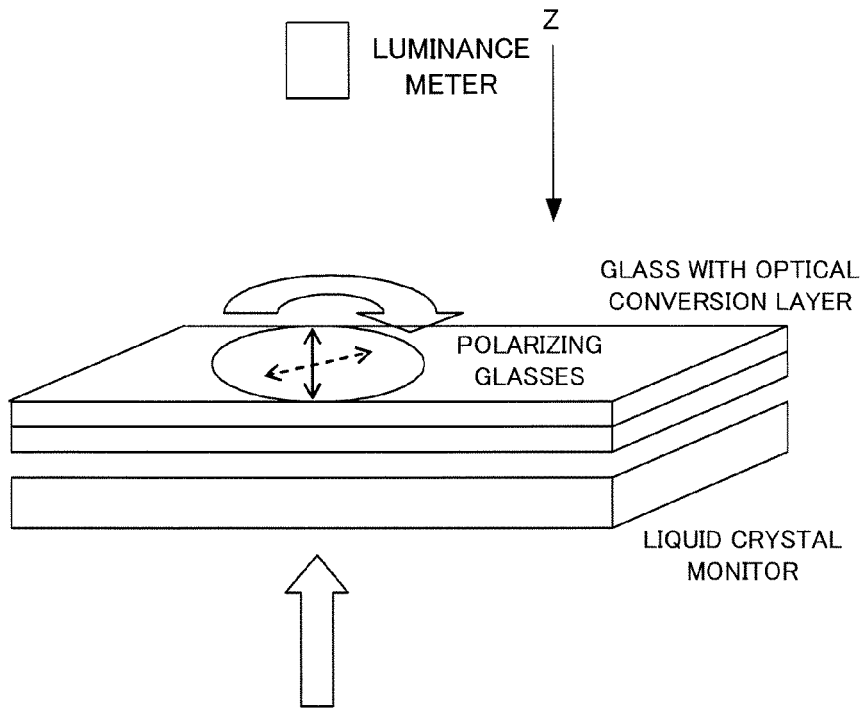
FIGS. 16A and 16B are schematic diagrams for describing the luminance with a luminance meter.
Figure 16B:
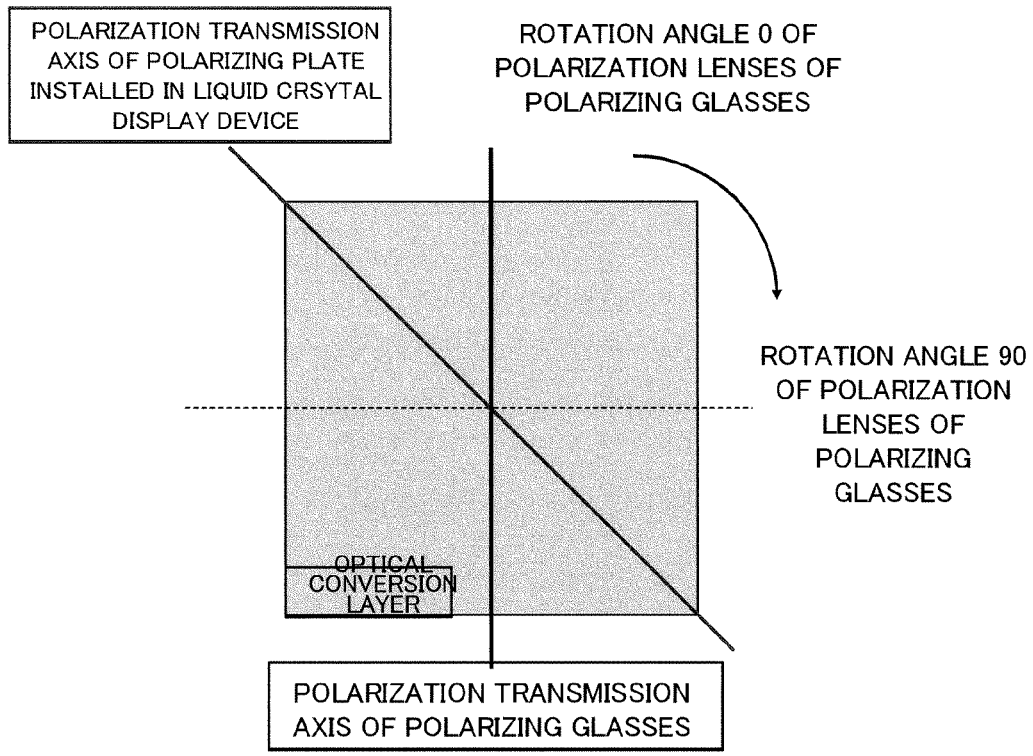

For examining the effects in the case of using the produced optical conversion layers in the above-mentioned examples, reference example, and comparative examples, evaluation was carried out by the following method. A schematic diagram of the evaluation method is shown in FIG. 6 (here, FIG. 16B is a diagram at the time of viewing FIG. 16A from the Z axis direction).

(1) The optical conversion layer is placed on a liquid crystal monitor (PLE-E1902WS® manufactured by IIYAMA).

(2) The polarization lenses of the polarizing glasses are installed thereon.

(3) A luminance meter (manufactured by TOPCON CORP. BM-5A®) is installed at a position away from the optical conversion layer by 600 mm.

(4) The luminance is measured while rotating the polarization lenses of the polarizing glasses. At the time, the relationship among the rotation direction and the rotation angle of the polarization lenses of the polarizing glasses and the polarization transmission axis of the liquid crystal is as shown in FIG. 6B.

The obtained evaluation results are shown in Table 2. Here, it is defined that 0.005 or less is linear polarization, and 0.9 or more is circular polarization.

TABLE 2

| | Composition | Rotation angle (*1) | Maximum luminance | Ellipticity (550 nm) | Note |
|---|---|---|---|---|---|
| Reference | Without optical conversion layer | 315 degrees | 161.6 cd/m$^2$ | 0.003 | The case with the polarization transmission axes coincide with each other |
| Example 13 | LC1057/LC756 = 98/2 | 35 degrees | 265.3 cd/m$^2$ | 0.09 | |
| Example 14 | LC1057/LC756 = 99/1 | 65 degrees | 240.5 cd/m$^2$ | 0.12 | |
| Example 15 | LC242/LC756 = 98/2 | 10 degrees | 196.7 cd/m$^2$ | 0.06 | |
| Reference example 1 | LC242/LC756 = 95/5 | 0 degrees | 99.5 cd/m$^2$ | 0.03 | Coating film color is observed green |
| Comparative Example 6 | λ/4 plate | — | 160.1 cd/m$^2$ | 0.997 | The maximum luminance is without the angle dependency |

(*1): The angle with a light transmitted the polarizing plate of the TN liquid crystal is brightest through the polarizing glasses.

What is claimed is:

1. A liquid crystal display device comprising a liquid crystal cell, a polarizer disposed on the display side of the liquid crystal cell, and an optical rotation plate disposed on the display side of the polarizer and having a function of rotating a polarization axis of linear polarization transmitted the polarizer, wherein the optical rotation plate further comprises a transparent substrate, and an optical rotation layer formed on the transparent substrate and containing a rod-shaped compound for forming a cholesteric structure, and the cholesteric structure has a 90 degrees or larger twist angle and a pitch in a range of 450 nm to 4,000 nm.

2. A liquid crystal display device comprising a liquid crystal cell, a polarizer disposed on the display side of the liquid crystal cell, and an optical conversion layer disposed on the display side of the polarizer and having a function of converting linear polarization transmitted by the polarizer into elliptical polarization.

3. The liquid crystal display device according to claim 2, wherein the optical conversion layer has the function of converting linear polarization transmitted by the polarizer into elliptical polarization with a longer axis direction provided in a direction different from that of a polarization transmission axis of the polarizer.

4. The liquid crystal display device according to claim 2, wherein the optical conversion layer has the function of converting linear polarization transmitted by the polarizer into elliptical polarization with a longer axis direction provided in a substantially vertical direction.

5. The liquid crystal display device according to claim 2, wherein the optical conversion layer contains a rod-shaped compound for forming a cholesteric structure.

6. The liquid crystal display device according to claim 2, wherein the optical conversion layer is produced by fixing a chiral nematic liquid crystal.

7. The liquid crystal display device according to claim 5, wherein the selective reflection wavelength of the optical conversion layer is 750 nm or more.

8. The liquid crystal display device according to claim 5, wherein a polarization transmission axis of the polarizer is inclined to the left side with respect to the vertical direction as viewed from the display side, and a rotation direction of the cholesteric structure is rightward rotation.

9. The liquid crystal display device according to claim 5, wherein a polarization transmission axis of the polarizer is inclined to the right side with respect to the vertical direction as viewed from the display side, and a rotation direction of the cholesteric structure is leftward rotation.

10. The liquid crystal display device according to claim 2, wherein the optical conversion layer converts the linear polarization into the elliptical polarization having an ellipticity in a range of 0.006 to 0.8.

\* \* \* \* \*